US008719304B2

(12) United States Patent
Golze

(10) Patent No.: US 8,719,304 B2
(45) Date of Patent: *May 6, 2014

(54) SYSTEMS, METHODS, AND GRAPHICAL TOOLS FOR REPRESENTING CONNECTEDNESS OF INDIVIDUALS

(76) Inventor: John Golze, West Jordan, UT (US)

( * ) Notice: Subject to any disclaimer, the term of this patent is extended or adjusted under 35 U.S.C. 154(b) by 774 days.

This patent is subject to a terminal disclaimer.

(21) Appl. No.: 11/133,510

(22) Filed: May 20, 2005

(65) Prior Publication Data

US 2005/0267903 A1 Dec. 1, 2005

Related U.S. Application Data

(60) Provisional application No. 60/575,781, filed on May 28, 2004.

(51) Int. Cl.
*G06F 17/30* (2006.01)
(52) U.S. Cl.
CPC .............................. *G06F 17/30292* (2013.01)
USPC .......................................... 707/793; 707/798
(58) Field of Classification Search
None
See application file for complete search history.

(56) References Cited

U.S. PATENT DOCUMENTS

| | | | |
|---|---|---|---|
| 4,483,680 A | 11/1984 | Daly | |
| 4,501,559 A | 2/1985 | Griswold et al. | |
| 4,865,548 A | 9/1989 | Snyder | |
| 5,226,158 A * | 7/1993 | Horn et al. | 707/201 |
| 5,467,471 A | 11/1995 | Bader | |
| 5,745,113 A * | 4/1998 | Jordan et al. | 715/835 |
| 6,416,326 B1 | 7/2002 | Gross | |
| 6,570,567 B1 | 5/2003 | Eaton | |
| 6,604,114 B1 * | 8/2003 | Toong et al. | 707/104.1 |
| 6,760,731 B2 | 7/2004 | Huff | |
| 7,523,128 B1 * | 4/2009 | Miller et al. | 707/102 |
| 2001/0041327 A1 * | 11/2001 | Gross | 434/154 |
| 2002/0032687 A1 * | 3/2002 | Huff | 707/104.1 |
| 2004/0083226 A1 | 4/2004 | Eaton | |
| 2004/0148275 A1 * | 7/2004 | Achlioptas | 707/3 |
| 2010/0106752 A1 * | 4/2010 | Eckardt et al. | 707/805 |

OTHER PUBLICATIONS

Sorenson, James L., "Finding True Balance", 2001, Deseret Book Company, Salt Lake City, Utah, pp. 36-39.

* cited by examiner

*Primary Examiner* — Robert Beausoliel, Jr.
*Assistant Examiner* — Nirav K Khakhar
(74) *Attorney, Agent, or Firm* — Holland & Hart, LLP; Bryan G. Pratt

(57) ABSTRACT

An embodiment of a system for representing connectedness of individuals includes nodes representative of individuals and strands connecting the nodes. The nodes include a first node representative of a first individual and a second node representative of a second individual. The strands connect the first node and the second node. Each of the strands represents a type of relationship between the first individual and the second individual. In some embodiments, each of the strands is in the form of a distinct data object.

32 Claims, 13 Drawing Sheets

SYSTEMS, METHODS, AND GRAPHICAL TOOLS FOR REPRESENTING CONNECTEDNESS OF INDIVIDUALS

RELATED APPLICATION

The present application claims priority under 35 U.S.C. §119(e) to U.S. Provisional Patent Application Ser. No. 60/575,781, by John Golze et al., filed on May 28, 2004, and entitled "A Method and System for Linking Genealogical and Genetic Relationships," the contents of which are hereby incorporated by reference in their entirety.

The present application is related to a utility patent application entitled "Systems, Methods, and Graphical Tools for Representing Fundamental Connectedness of Individuals," by John Golze, filed concurrently herewith, the contents of which are hereby incorporated by reference in their entirety.

BACKGROUND

Individuals, or other entities, can be connected to each other in many different ways. For example, individuals may be genealogically connected to each other, such as by parent-child, sibling, or other types of relationships. The gathering of information regarding individuals and the relationships between individuals is generally referred to as genealogy. Typical gathered information might include dates and places of events such as birth, marriage, death, and other events that occur in the lives of individuals. Other types of information (e.g., medical, DNA, and disease tracking information) may also be gathered depending on the particular application of the data or the interests of the researcher.

Many tools exist for storing genealogical data and for representing the genealogical relationships between individuals. In particular, many genealogical tools exist that are able to represent relationships between families, ancestors, and descendants. One common genealogical tool is a pedigree chart, which visually represents relationships in the form of a tree. Another common genealogical tool is a group record (e.g., a family group record), which organizes individuals into a group.

These and other conventional genealogy tools have been implemented in software applications capable of operating on computing devices. The software applications typically have access to databases capable of storing vast amounts of genealogical information. The information contained in the databases, which is often organized by group records and/or event information, can be accessed and displayed in the form of pedigree charts or other similar tree-like representations of relationships. Such software applications leverage the significant computing power of modem computing devices to enhance the capabilities of traditional genealogical tools. In addition, conventional software applications provide for the sharing of genealogical data between different computing devices. For example, genealogical data communication ("GEDCOM") format is a well-known data format used by many genealogical software programs for importing and exporting genealogical data.

While conventional genealogical tools have provided many benefits associated with representing relationships between individuals, several shortcomings are inherent in the conventional tools. These shortcomings are largely a result of reliance upon traditional theories underlying the use of pedigree charts (which are based on a family-tree paradigm), event information, and/or group records for organizing and representing genealogical data.

Pedigree and other tree-like charts tend to represent genealogical data in a cumbersome manner. This is largely due to the significant size of pedigree charts required to represent multiple generations. Due to the size of multi-generational pedigree charts, paper-based pedigree charts are generally fragmented onto different pieces of paper. The same fragmentation is also inherent in software applications, in which separate pedigree chart views are typically required to legibly depict the relationships between individuals of multiple generations. Such fragmented representations are less than intuitive and are often difficult to manipulate, piece together, and understand.

Genealogical tools using tree-like charts exhibit additional limitations. For example, conventional pedigree charts are not capable of intuitively differentiating the numerous possible types of relationships that may exist between individuals. A traditional pedigree chart typically includes nodes representative of individuals. The nodes are connected together by lines or other similar representations. Unfortunately, multiple connected nodes often share a common connection line having multiple branches. The common connection line is not useful for depicting different types of connections between the individuals. To further illustrate this limitation of conventional genealogical tools, FIG. 1 illustrates a tree-like representation of relationships between nodes, using a notation commonly used in anthropology. As shown in FIG. 1, a common line 10 branches to connect multiple nodes 12, 14, 16, 18, and 20 together. Such an arrangement is often used to depict the parent-child relationships between a parent and his or her children. Unfortunately, the use of a common line to connect multiple individuals is not useful for depicting any differences that may exist in each distinct parent-child relationship. For example, the tree-like chart of FIG. 1 is not useful for distinguishing an adoption relationship versus a natural-child relationship.

Pedigree charts are also limited in that they are able to represent only limited types of relationships. For example, a pedigree chart typically allows representation of only one spouse, one child, and one set of parents. This means that a pedigree chart cannot be used to represent a former spouse, multiple children, siblings, or both adoptive and biological parents. In other words, a single pedigree chart is not useful for representing many complex relationships that are common to society.

The rigid limitations of pedigree charts often require researchers to supplement pedigree charts with additional tools, such as group records or additional pedigree charts. Many conventional genealogical tools actually require that data be grouped into predefined group records. Unfortunately, the use of group records comes with limitations, including the fragmentation and duplication of data between various group records. For example, when an individual is connected to two separate group records, each of the group records typically contains duplicate information about the individual. For instance, a particular individual may be a child in a first family group record and a spouse in another family group record. Consequently, the information associated with the particular individual will either be fragmented or duplicated for each of the group records. Both options are undesirable for several reasons. The duplication of data wastes memory space and may lead to inconsistencies between data. Meanwhile, fragmented data may introduce complexity and costs to many typical genealogical application operations, such as searching for information. These problems are magnified by a lack of uniformity between different genealogical tools because one definition of a group record does not necessarily accommodate different definitions of group records.

Conventional genealogical database structures typically mirror pedigree-chart and/or group record representations of relationships. Accordingly, the conventional database structures tend to include the same inherent limitations discussed above. For example, conventional databases typically include records for individuals and/or groups. The records may include information associated with the individuals or with the relationships between the individuals. In particular, the records usually include information identifying other records to which there is a connection. For example, a group record is typically required and includes information identifying the individual records of an individual, the spouse, and the children. This type of database structure produces several undesirable limitations, including a lack of capability for associating information (e.g., link events) with a connection between individuals directly, since linkage is only implied by virtue of the method of grouping individual records into the same group record. Alternatively, conventional genealogical tools may associate such information with records of individuals. This often leads to the storing of duplicate information in more than one group or individual record, which is inefficient and wastes valuable memory space as discussed above. As an alternative to the duplication of data, genealogical information is often fragmented across multiple individual records, thereby introducing operational complexity into the database, which complexity undesirably limits search functionality by making it difficult for search operations to maneuver between records of individuals and groups.

Moreover, many conventional genealogical databases include event-based organizational structures, which further fragment genealogical data according to event-based information. For example, some large genealogical databases are fragmented by location information, such as a country of origin. This type of structuring introduces disconnectedness between individuals who might be otherwise connected to each other across geographic or national boundaries.

The fragmentation of genealogical information across conventional database boundaries (e.g., geographic boundaries) traditionally tended to introduce inconsistencies into the genealogical data. For example, personal names are invariably spelled in many different ways, requiring a variation-neutralizing algorithm and lookup table of names. In the past, databases contained many separate tables, each trained on a geographical area (e.g. countries), without cross-country correlation. A particular name variation would be handled differently in different tables. The lack of cross-correlation led to duplication of records, because name-variations were not neutralized identically for different countries, and records were not recognized as being duplications.

By relying solely, primarily, or heavily upon records of individuals and of groups of individuals for storing connection-based or other types of genealogical information, conventional database structures are not useful for robustly and flexibly representing and identifying myriad different types of relationships that may exist between individuals. Thus, conventional genealogical tools rely upon cumbersome, inefficient, unintuitive, and inflexible data organizational schema and visual representations. This is especially limiting for conventional genealogical tools that require group records for expressing relationships between individuals. Consequently, conventional genealogical tools are limited with respect to representing a wide variety of different types and characteristics of connectedness between individuals.

SUMMARY

An embodiment of a system for representing connectedness of individuals includes nodes representative of individuals and strands connecting the nodes. The nodes include a first node representative of a first individual and a second node representative of a second individual. The strands connect the first node and the second node. Each of the strands represents a type of relationship between the first individual and the second individual.

In some embodiments, each of the strands is in the form of a distinct data object. In some embodiments, each strand connects exactly two of the nodes. In some embodiments, the nodes and strands are connected to form one or more link triangles. In some embodiments, links and nodes forming link triangles are combined to form a network of link triangles.

An embodiment of a computer-implemented user interface for visually representing connectedness of individuals includes a display of a first node representative of a first individual, a display of a second node representative of a second individual, and a display of a link connecting the first node and the second node. The link includes strands connecting the first node and the second node. Each of the strands is representative of a type of relationship between the first individual and the second individual.

BRIEF DESCRIPTION OF THE DRAWINGS

The accompanying drawings illustrate various embodiments of the present methods, systems, and graphical tools and are a part of the specification. Together with the following description, the drawings demonstrate and explain the principles of the present methods, systems, and graphical tools. The illustrated embodiments are examples of the present methods, systems, and graphical tools and do not limit the scope thereof.

Throughout the drawings, identical reference numbers designate similar, but not necessarily identical, elements.

DETAILED DESCRIPTION

Figure 1:
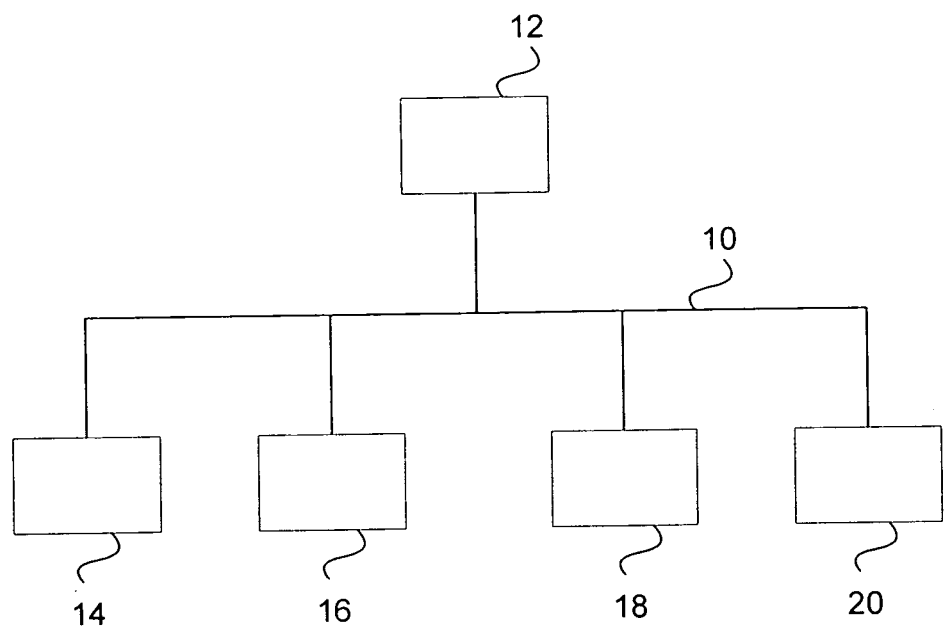
FIG. 1 is a block diagram illustrating a conventional anthropological notation for representing relationships between a parent and his or her children.

The present specification describes systems, methods, and graphical tools (collectively the "system") for representing connectedness of individuals. The system provides functionality for robustly and flexibly representing and depicting myriad different types and combinations of connections that might exist between individuals. In the system, links connect nodes representative of individuals. The links typically have a fine-structure referred to as strands. In particular, each link includes one or more strands, which are representative of particular types of connections between individuals. Thus, multiple strands may connect two nodes to describe multiple types of connections between the individuals associated with the nodes. Generally, this allows the system to flexibly and robustly represent and visually distinguish many different types of connections that might exist between individuals. The system can be easily adapted to accurately represent connections in accordance with different cultures and customs, or for a wide variety of different applications. In some embodiments, each link connects exactly two nodes, which configuration generally enables the visual depiction of different types of connections between individuals.

Each strand of a link is typically represented as a distinct data object. Accordingly, the system is flexible because the modularity of the strands allows them to be easily added, deleted, or modified, without affecting other strands. A link may include multiple strands to represent numerous different types of connections between individuals. Moreover, information (e.g., primarily link-based information) can be stored in or directly associated with the strands of links. This capability generally saves valuable memory space and reduces occurrences of duplication and fragmentation of data across different nodes. Consequently, system operations can be performed efficiently.

The system is configured to generate graphical link maps including nodes and links to illustrate connectedness of individuals. In many embodiments of the link maps, link triangles are used as elemental building blocks for the link maps. Link triangles include three nodes connected by three links to form a triangle shape. The link triangles are based on immediate, i.e. fundamental, connections between individuals, where the individuals connected are associated with one or more of the three fundamental roles of child, spouse, and parent. For example, an exemplary link triangle includes nodes representative of a father, a mother, and a child. The father and the mother are connected to each other by a link, and the child is linked to the father and to the mother by separate links. Accordingly, the link triangle can be used to atomically represent a biologically fundamental unit that is common across all cultures, customs, and times. Because the link triangle is fundamental, it helps to reduce data fragmentation and duplication that resulted from the centering of data structuring on groups (e.g., immediate family groups) in conventional genealogical tools. Not being required to define a group at all also provides the flexibility to define groups in any way one chooses, if desired.

Moreover, the present systems, methods, and graphical tools provide for removing geographical/historical (i.e. space-time) boundaries from conventional geographic database organization. The removal of boundaries overcomes the problem of fragmentation because links are not broken at geo-political boundaries (or other types of boundaries). In addition, the removal of boundaries creates preconditions helpful for overcoming a particular type of data duplication. The removal of boundaries further means that a global algorithm and lookup table can be applied to neutralize personal name variations. The global uniformity thus achieved eliminates systemic sources of duplication. Those skilled in the art understand and can provide a suitable algorithm and lookup table. These and other benefits provided by the system will be described further below.

In the following description, for purposes of explanation, numerous specific details are set forth in order to provide a thorough understanding of the present methods, systems, and graphical tools for representing connectedness between individuals. It will be apparent, however, to one skilled in the art that the present methods, systems, and graphical tools may be practiced without these specific details. Reference in the specification to "one embodiment" or "an embodiment" means that a particular feature, structure, or characteristic described in connection with the embodiment is included in at least one embodiment. The appearances of the phrase "in one embodiment" in various places in the specification do not all necessarily refer to the same embodiment.

I. Exemplary System Elements

Figure 2:
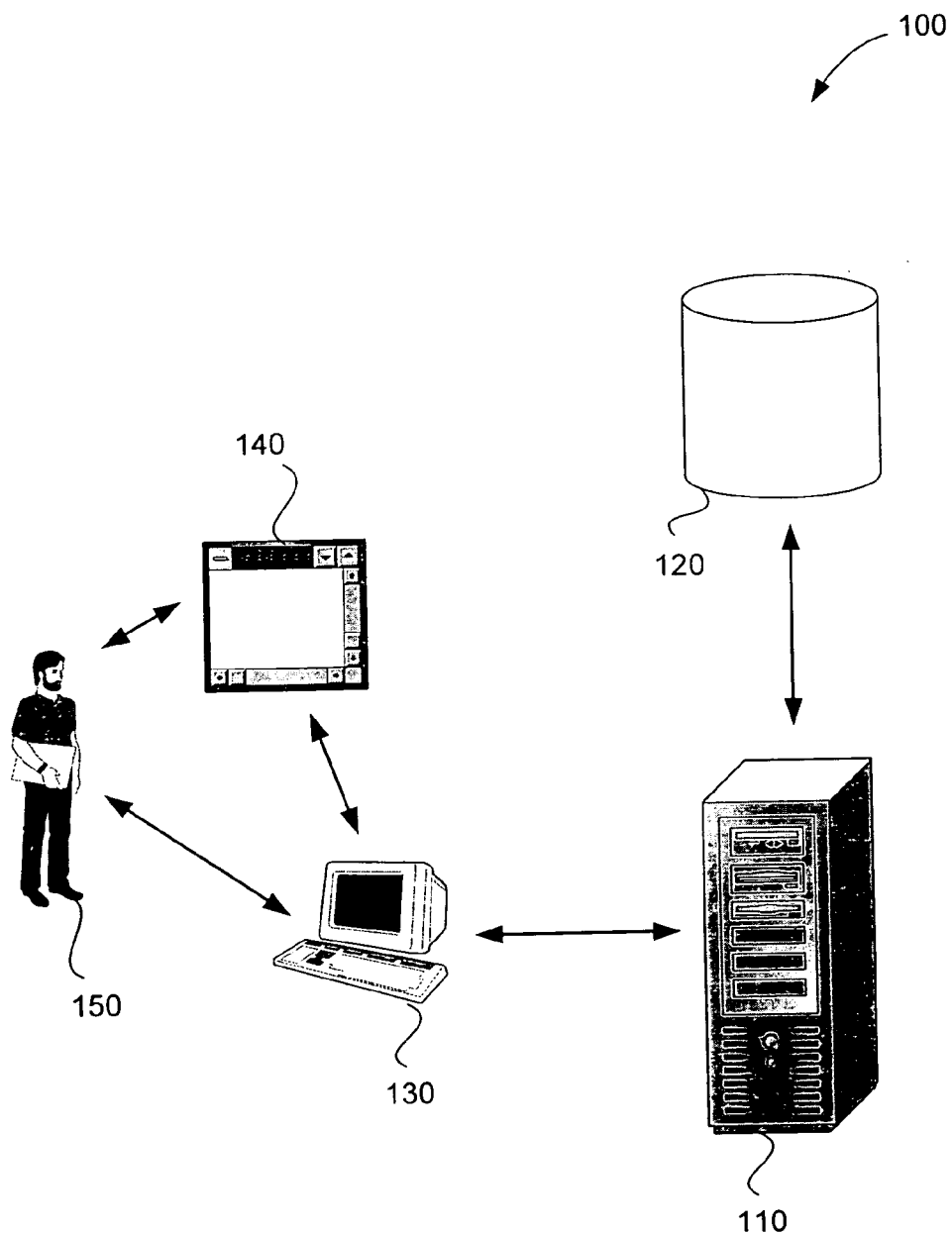
FIG. 2 is an environmental view of a particular implementation of a system for representing connectedness of individuals, according to an exemplary embodiment.

FIG. 2 is an environmental view of a particular implementation of a system 100 for representing connectedness of individuals, according to an exemplary embodiment. The system 100 may be implemented as instructions on a computer-readable medium. The instructions may be configured to instruct a computer 110, or one or more processors (not shown) of the computer 110, to perform predefined processes, including any of the processes described herein. The instructions may be in the form of one or more software applications configured to run on the computer 110. The computer-readable medium may comprise any medium or media capable of storing instructions that may be read by the computer 110.

As shown in FIG. 2, the computer 110 may communicate with a data store 120 and an access device 130. The communications can be made using any known type of communication media and protocols, including the Internet and protocols associated therewith. The computer 110 may provide the access device 130 with information useful for presenting a user interface 140 for consideration by a user 150. The user 150 may use the access device 130 and the interface 140 to interact with the computer 110. Each of the elements shown in FIG. 2 will now be described in greater detail.

A. User

The user 150 is typically a human being that can utilize the access device 130 to input information to and/or consider output from the computer 110, either through manual dataentry or through importing/exporting existing data sets (such as Gedcom-files). However, the user 150 may be another living organism, an automated agent, or some form of intelligence technology that is configured to provide input to the computer 110. Typically, the user 150 is in physical proximity to the access device 130.

B. Access Device

The access device 130 can include any device or devices physically accessible to the user 150 or that otherwise allow the user 150 to provide input to, receive information from, or access the computer 110. The access device 130 may include but is not limited to one or more desktop computers, laptop computers, tablet computers, personal data assistants, cellular telephones, satellite pagers, wireless internet devices, embedded computers, video phones, mainframe computers, mini-computers, workstations, network interface cards, programmable logic devices, entertainment devices, gaming devices, client devices, and other future devices that may not yet currently exist. The access device 130 may include various peripherals such as a terminal, keyboard, mouse, screen, printer, stylus, input device, output device, or any other apparatus that can help relay information between the user 150 and the computer 110. The access device 130 may be configured to present the user interface 140 for consideration and/or use by the user 150.

The access device 130 may be located proximate or remote to the computer 110. The access device 130 and the computer 110 may communicate using any known media and protocols. In some embodiments, the access device 130 comprises a client device configured to communicate with the computer 110 over a network (e.g., the Internet). In other embodiments, the access device 130 comprises peripheral devices connected to the computer 110.

While FIG. 2 shows only one access device 130, this is for purposes of illustration and not intended to be limiting. Other embodiments may include multiple access devices 130 in communication with the computer 110.

C. User Interface

The user interface 140 may be used by the user 150 to access the computer 110 via the access device 130. For example, the user interface 140 may be used to initiate and/or interpret communications with the computer 110. Accordingly, the user interface 140 may include mechanisms for prompting for and receiving input from the user 150. In an exemplary embodiment, the user interface 140 comprises a graphical user interface ("GUI") capable of displaying data representative of individuals and connections between the individuals. The GUI may be associated with a software program operating on the computer 110. In some embodiments, the user interface 140 comprises a web form. However, the user interface 140 is not limited to a web form embodiment and can include many different types of user interfaces 140 capable of presenting data to and/or receiving input from the user 150. Several exemplary views of the user interface 140, and data presented therein, will be discussed further below.

While FIG. 2 shows only one user interface 140, this is for purposes of illustration and not intended to be limiting. Other embodiments may include multiple user interfaces 140 being provided by the access device 130.

D. Data Store

The data store 120 may comprise one or more storage mediums, devices, or configurations, including databases. The data store 120 may employ any type, form, and combination of storage media known to those skilled in the art. The data store 120 may include any known technologies useful for storing and accessing information. For example, the data store 120 may include structured query language ("SQL") technologies, including one or more SQL servers. The data store 120 may include one or more databases, which may be in the form of hierarchical, relational, or other types of databases. The databases may be created and maintained using any known database technologies.

The data store 120 may be integrated with or external of the computer 110. The computer 110 and the data store 120 may communicate using any known media and protocols. In some embodiments, the data store 120 comprises one or more central databases.

The data store 120 may be configured to store predefined data, as well as information received from the access device 130. In particular, the data store 120 may store information associated with individuals and connections between individuals. The information may be stored in the form of data objects representative of individuals and connections between the individuals. The data objects may be stored in one or more tables. Several exemplary embodiments of data store 120 tables and data objects, and information stored therein, will be discussed further below.

E. Computer

The computer 110 can include any device or combination of devices that allows the processing of the system 100 to be performed. The computer 110 may be a general purpose computer capable of running a wide variety of different software applications or a specialized device limited to particular functions. In some embodiments, the computer 110 is the same device as the access device 130. In other embodiments, the computer 110 is a network of computing devices accessed by the access device 130. The computer 110 may include any type, number, form, or configuration of processors, system memory, computer-readable mediums, peripheral devices, computing devices, and operating systems. The computer may also include bio-computers or other intelligent device (e.g., artificially intelligent device). In many embodiments, the computer 110 is in the form of one or more servers (e.g., web servers), and the access device 130 is a client device accessing the servers.

The computer 110 is capable of executing steps for performing the functionality of the system 100, including generating and controlling the user interface 140 and interactions of the user interface 140 with the user 150. In particular, the computer 110 can generate and present data representative of individuals and the connectedness of the individuals to the user 150 by way of the user interface 140. Further, the computer 110 is able to process input received from the user 150 by way of the user interface 140.

As mentioned above, the functionality of the system 100 can be embodied or otherwise carried on a medium that can be read by the computer 110. The medium carrying the instructions (e.g., software processes) of the system 100 can be part of or otherwise communicatively coupled to the computer 110. In preferred embodiments, the instructions are configured to cause the computer 110 to perform the steps of exemplary methods disclosed herein.

While an exemplary implementation of the system 100 is shown in FIG. 2, those skilled in the art will recognize that the exemplary environment components illustrated in the Figure are not intended to be limiting. Indeed, those skilled in the art will recognize that other alternative hardware environments may be used.

II. Exemplary User Interface Views

The computer 110 may be configured to output data representative of various forms of user interface views, which may be sent to the access device 130 for presentation in the user interface 140. The data may be transmitted to the access device 130 in any suitable format, including HTML pages. The computer 110 may include various predefined page templates for use in forming a variety of user interface views.

Figure 3:
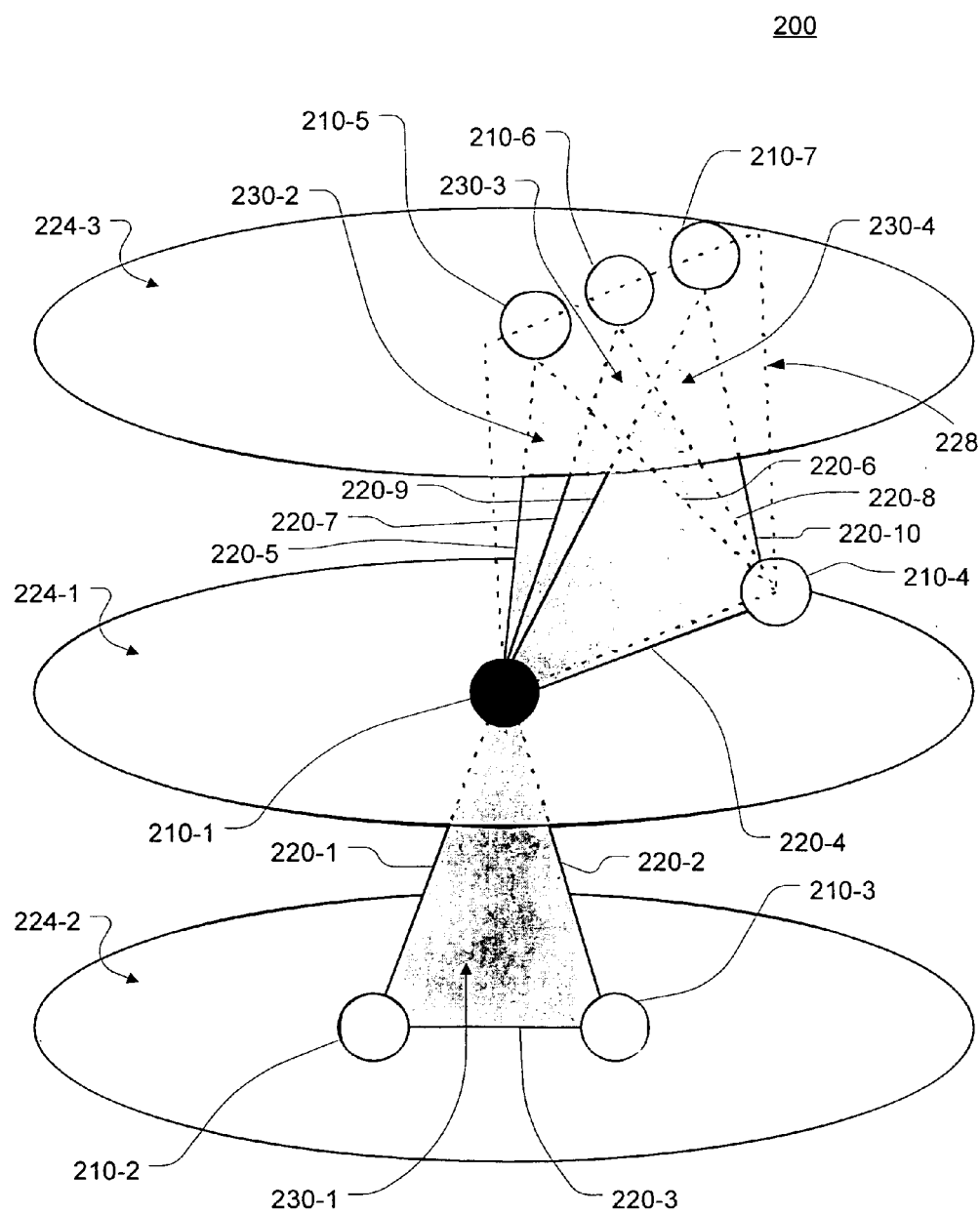
FIG. 3 is a block diagram illustrating an example of a link map presented in the user interface of FIG. 2, according to an exemplary embodiment.

FIG. 3 is a block diagram illustrating an example of a link map 200 that may be presented in the user interface 140, according to an exemplary embodiment. As shown in FIG. 3, nodes 210-1 through 210-7 (collectively the "nodes 210") are connected by links 220-1 through 220-10 (collectively the "links 220"). The nodes 210 may represent individuals. Throughout the description and the appended claims, the term "individual" typically refers to a human being, living or deceased. However, the term "individual" may also refer herein to any living or deceased organism (e.g., an animal), or to a non-living entity (e.g., a business or other organization).

Figure 4:
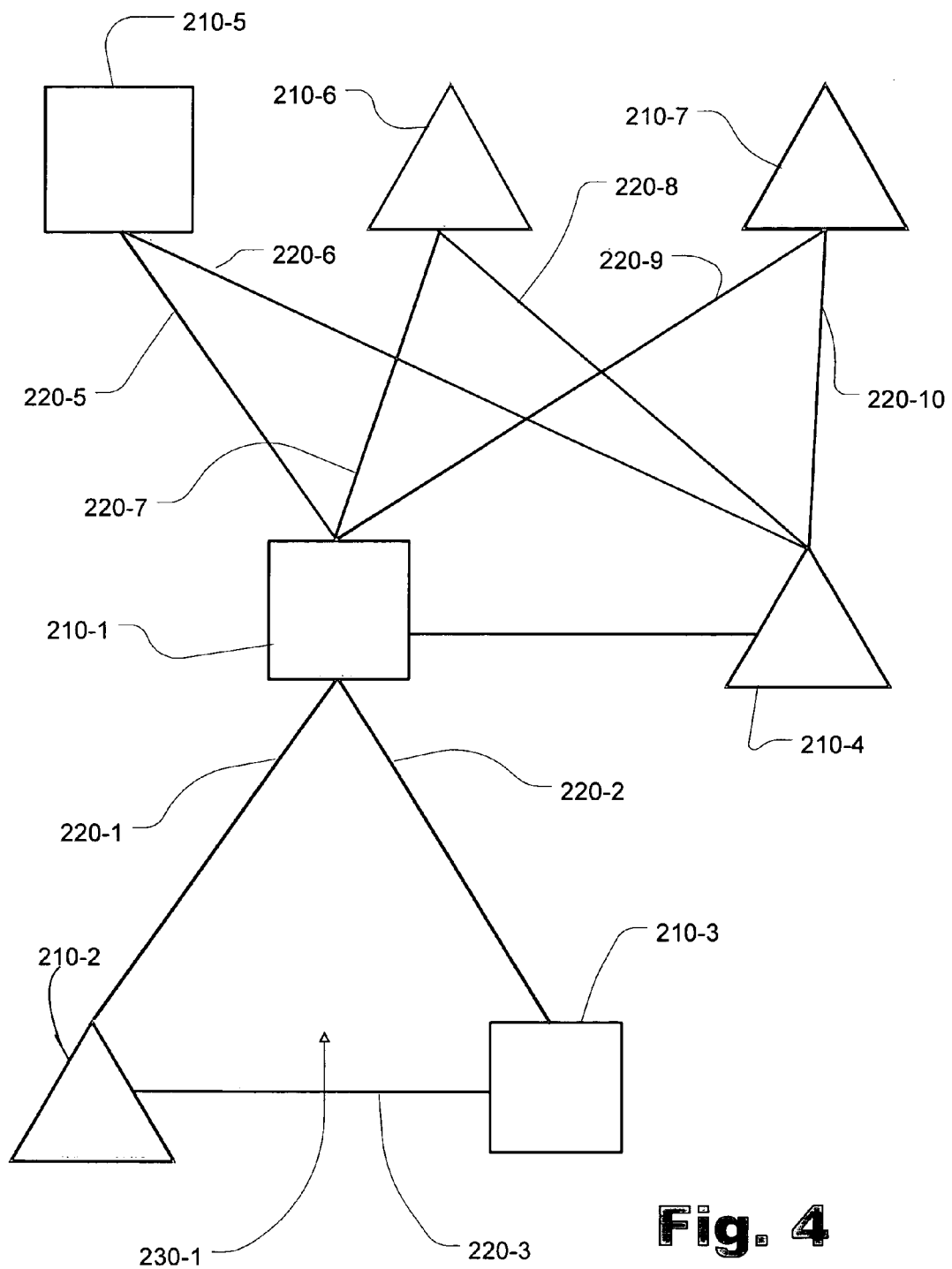
FIG. 4 is a block diagram illustrating another form of the link map of FIG. 3, according to an exemplary embodiment.

The nodes 210 may be presented in the user interface 140 using any suitable form of visual representation. In FIG. 3, for example, the nodes 210 are in the form of circles. In other embodiments, other geometric shapes or combinations of geometric shapes may be used. The geometric shapes may identify particular characteristics and/or roles of individuals. For example, squares may represent male individuals, and triangles may represent female individuals, as shown in FIG. 4, which illustrates another example of a link map, according to an exemplary embodiment. As one of many possible alternatives to geometric shapes, different colors, patterns, or shading may be used to differentiate between male and female individuals, or to identify any characteristic associated with individuals. In FIG. 3, the node 210-1 is shaded to identify a focus individual, while the other nodes 210-2 through 210-7 are empty to indicate non-focus individuals.

Numbers, names, or other textual identifiers may be used to visually identify the nodes 210. Roles such as child, spouse, and parent, for example, may also be visually identified in the link map 200. As will be discussed in detail below, each of the nodes 210 may be represented in the data store 120 as a distinct data object, which may include or be associated with information related to individual events, characteristics, roles, names, places, dates, identifiers, addresses, personal statistics, medical histories, and any other potentially useful information.

As shown in FIG. 3, the nodes 210 are connected to one another by the links 220. The links 220 may be configured to identify any suitable types, natures, and/or characteristics of connectedness between individuals. In particular, each of the links 220 may comprise a bundle of one or more strands. Each of the strands may be dedicated to representing a particular type of connectedness. As discussed in greater detail below, the strands may be represented as distinct data objects in the data store 120. This provides significant flexibility and robustness for representing a wide range of different types of connections between individuals. For example, any particular link 220 may comprise a natural strand, a societal strand, and a religious strand. As discussed below with reference to FIGS. 6 and 7, the natural strand may identify natural kin (i.e., bloodline) connectedness, the societal strand may identify legal connectedness (including common-law, customs-based, and traditions-based connectedness), and the religious strand may identify connectedness by way of religious rites.

In the link map 200 shown in FIG. 3, each of the links 220 connects exactly two nodes 210. Because the links 220 do not connect more than two nodes 210, connection information that is specific to two individuals can be directly associated with the link 220 connecting the two individuals. This structure provides significant flexibility in representing and depicting different types, events, and characteristics of connections between individuals. In particular, the system 100 is able to depict a wide variety of many different types of connections between any two individuals. Accordingly, the system 100 is able to visually distinguish different combinations of connectedness between different individuals. For example, the link map 200 may represent connections to an adopted child (societal strand) and to a natural child (natural strand) in a visually distinguishable manner.

Any potentially useful information related to connections between individuals may be directly associated with the links 220. For example, information about an adoption event, such as the date of the adoption, may be tied directly to a particular link 220 connecting a parent with an adopted child. Accordingly, link events and other connection information can be stored in or be otherwise directly associated with the links 220, without having to be stored as part of data records of individuals or as part of a group record. By associating information directly with the links 220, data is consolidated, and instances of duplicate data are reduced. Data conventionally stored in different individual and group records can be stored in association with the links 220, without having to be fragmented across multiple group or individual records. This configuration allows information related directly to individuals to be tied directly to the nodes 210, while information related directly to connections between individuals to be tied directly to the links 220.

Links 220 may include data representative of certainty scores for the links. The certainty score or marker may be displayed on or proximate to the links 220 in the link map 200. In one embodiment, for example, a certainty marker (e.g., a question mark) is configured to be displayed when the certainty score for any particular link 220 is below a predetermined confidence threshold.

The orientation of the links 220 may identify various types and natures of connectedness of individuals. For example, links 220 that are generally vertically oriented may represent connectedness between nodes 210 in different generations. In particular, generally vertical links 220 may identify parent-child relationships between individuals. Links 220 that are generally horizontal may represent connectedness between nodes 210 within a common generation. For example, generally horizontal links 220 may identify a couple relationship (e.g., a spousal and/or procreative connection) between individuals.

In the system 100, the nodes 210 and links 220 are fundamental elements for representing the connectedness between individuals. Thus, the primary schema of connectedness is based on the nodes 210 and links 220. The system 100 does not rely primarily upon events and groupings for representing connectedness. However, the system 100 may provide capability for producing secondary information, such as events and groupings, based on the fundamental elements. For example, the link map 200 may include groupings of individuals and/or events associated with either individuals or connectedness between the individuals. FIG. 3 illustrates examples of secondary groups of nodes 210, which groups may be in any suitable form and may be predefined or derived according to the intent of a researcher or of an operator of the system 100. The link map 200 of FIG. 3 includes, for example, groupings of nodes 210 in the form of generational planes 224-1 through 224-3 (collectively "generational planes 224") and a family plane 228, each of which will now be described in detail.

As shown in FIG. 3, nodes 210 may be organized into the generational planes 224 in a manner that illustrates generational boundaries. In FIG. 3, for example, the generational plane 224-1 includes the focus node 210-1 and the node 210-4, which grouping includes contemporary individuals represented by nodes 210-1 and 210-4. For instance, node 210-1 may represent a focus individual, and node 210-4 may represent a spouse or procreative partner of the focus individual. The generational plane 224-2, positioned below the generational plane 224-1 in FIG. 3, includes the nodes 210-2 and 210-3, which may represent parents of the focus individual. The generational plane 224-3, positioned above the generational plane 224-1 in FIG. 3, includes the nodes 210-5 through 210-7, which may represent children of the individuals represented by nodes 210-1 and 210-4. The generational planes 224 provide an intuitive visual representation of generational associations between the nodes 210.

The link map 200 may be configured with directionality representative of the measurement of time. In FIG. 3, for example, time is measured in a preferred mode upwards by positioning child nodes 220 above their parent nodes 220. However, while less preferred, the generational planes 224 may be positioned according to any predefined directionality of the link map 200. Furthermore, vertical links 220 generally may include directionality data identifying whether one traverses the links 220 in forward or backward direction of time.

The family plane 228 may be used to visually depict a familial group of individuals. In FIG. 3, the family plane 228 represents a group of individuals that make up an immediate family. In particular, nodes 210-1 and 210-4 may represent the parents of the individuals represented by nodes 210-5 to 210-7. Because of this connectedness to one another, the nodes 210-1 and 210-4 through 210-7 may be arranged on a common family plane 228 in the user interface 140. Alternatively, other spatial organizations may be used.

Other secondary groupings of individuals may be identified by the system 100. For example, household groups may be formed to identify subsets of living individuals residing at a common address. Secondary groups may be explicit or implicit. Implicit groups are algorithmically derivable from the nodes 210 and the links 220, while explicit groups are not derivable. The nodes 210 on the family plane 228 are an example of an implicit group. Members of a tribe may be an example of an explicit group.

In many embodiments, triplets of nodes 210 are organized into link triangles. In FIG. 3, nodes 210-1 through 210-3 form link triangle 230-1, nodes 210-1, 210-4, and 210-5 form link triangle 230-2, nodes 210-1, 210-4, and 210-6 form link triangle 230-3, and nodes 210-1, 210-4, and 210-7 form link triangle 230-4. The link triangles 230-1 through 230-4 are collectively referred to herein as the "link triangles 230."

Figure 5:
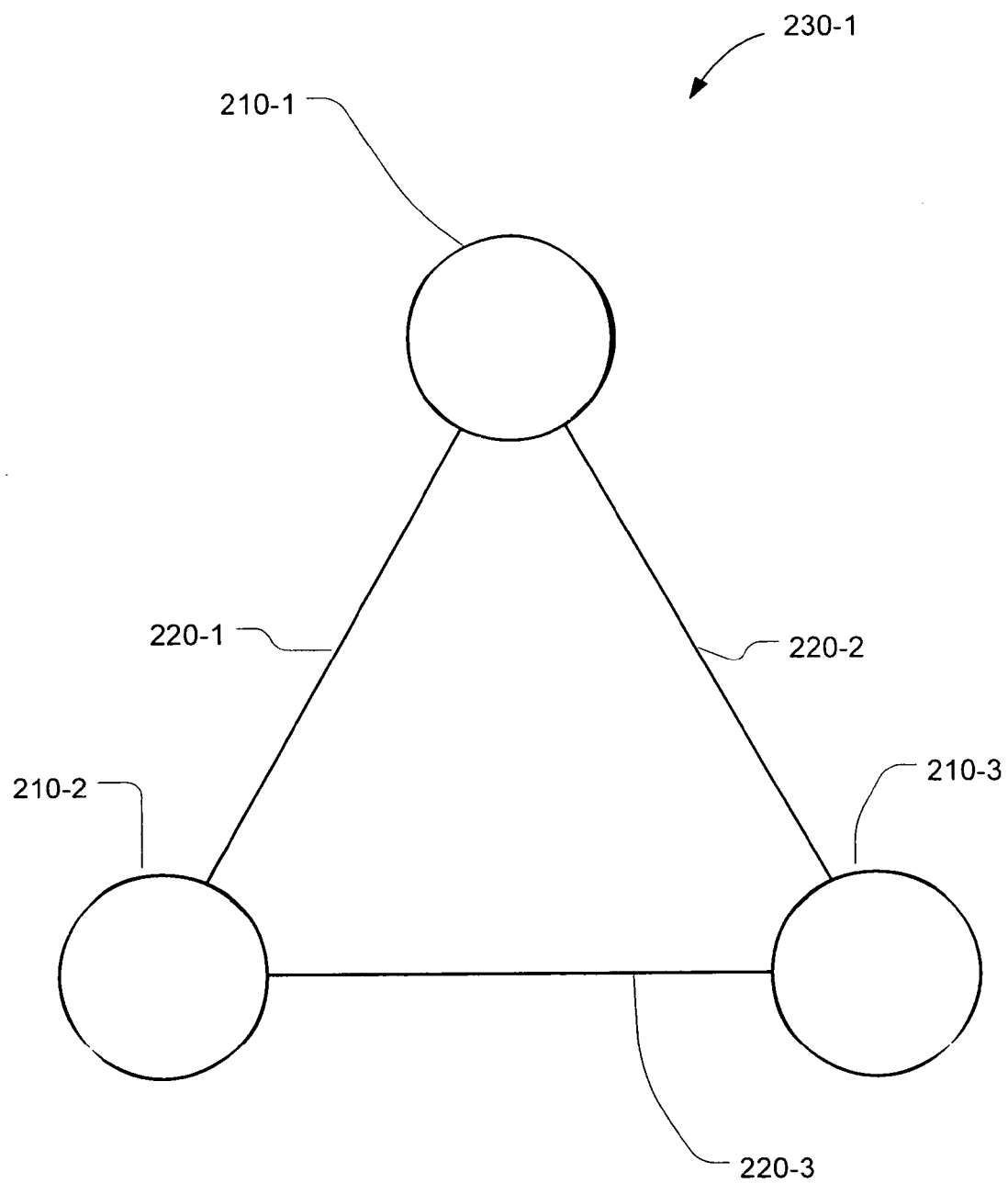
FIG. 5 is a block diagram illustrating an example of a link triangle used in the link map of FIG. 3, according to an exemplary embodiment.

FIG. 5 is a block diagram illustrating an enlarged view of the link triangle 230-1 of FIG. 3, according to an exemplary embodiment. As shown in FIG. 5, node 210-1 may be connected to node 210-2 by link 220-1 and to node 210-3 by link 220-2. Node 210-1 may represent a focus individual, while nodes 210-2 and 210-3 may respectively represent a mother and father of the focus individual. Accordingly, link 220-1 identifies a maternal inter-generational connectedness (i.e., mother-child) between nodes 210-1 and 210-2, and link 220-2 identifies a paternal inter-generational connectedness (i.e., father-child) between nodes 210-1 and 210-3. Node 210-2 may be connected to node 210-3 by link 220-3, which may identify a wife-husband connectedness (e.g., a procreative relationship and/or marriage) between nodes 210-2 and 210-3.

The link triangle 230-1, as well of other link triangles 230, may represent fundamental natural-born connectedness between parents and a child. The link triangles 230 may be defined and used as elemental building blocks of the link map 200. Each of the link triangles 230 includes three nodes representative of a father, a mother, and an offspring. In many embodiments, each of the nodes 210 is a member of at least one link triangle 230.

The connectedness illustrated in the link map 200 may be fundamentally based on link triangles 230. In particular, the natural kinship connectedness of individuals is particularly well-suited for representation using the link triangles 230 because procreation is based on fundamental connections between two parents and an offspring. Thus, the individuals represented by the nodes 210 of a link triangle 230 will typically have roles of spouse (or similar role), child, and parent. In some embodiments, each link 220 exists only between individuals having the roles of spouse, child, or parent. Secondary groupings of individuals, such as family grouping, may include one or more link triangles 230. For example, a nuclear family including two parents and three children will include three link triangles 230, such as the link triangles 230-2, 230-3, and 230-4 shown in FIG. 3.

The link triangle 230 is also well-suited for representing "sealing" relationships in accordance with tenets of The Church of Jesus Christ of Latter-Day Saints. According to these tenets, certain individuals may be "sealed" together for eternity. For, example, a couple may be "sealed" together so that their marriage may continue beyond death. Similarly, a child may be "sealed" to his or her parents for eternity. The link triangle 230 represents both types of "sealings"—the first being between the members of a couple and the second being between a child and each of his or her parents. In some embodiments, each link 220 exists only between individuals having "sealable" roles of parent, child, and spouse. In such embodiments, siblings are not directly connected by links 220.

Because information about all individuals and connections represented in link triangles 230 may not be known, the system 100 may provide placeholder nodes and links. For example, when no information is available for the father individual represented by node 210-3 in FIG. 5, node 210-3 may be in the form of a placeholder node containing limited information concerning its association with links 220-2 and 220-3. Similarly, the links 220-2 and 220-3 may be in the form of placeholder links, containing limited information concerning the connectedness of the links 220-2 and 220-3 to the nodes 210-1, 210-2, and 210-3.

When information about a group, or number, of individuals and/or links is unknown, the system 100 may provide pseudo-nodes and/or pseudo-links to represent such unknown information. In particular, when the number of links through which two individuals are connected is unknown, a pseudo-link may be placed between the nodes representative of the individuals in a link map. Similarly, when the number of individuals that are identically connected to other individuals is unknown, a pseudo-node may be placed at the end of the common links. A pseudo-node represents a group of intra-generational individuals who share the same links. The individuals may be grouped because their number is unknown, or for convenience in visually representing the common connectedness of these individuals. Similarly, a pseudo-link represents a group of serially arranged inter-generational links (i.e., an inter-generational chain) and may be used when the number of links connecting two individuals is unknown, or for convenience in visually representing the connectedness of the individuals.

The system 100 may also provide image nodes, image links, and transition links for representing multiple positions of nodes 210 and links 220 in the link map 200. For example, a particular individual, by marriage, may have a place in two different generational planes 224 in the link map 200. In one of the positions, an image node may stand in place of the actual node 210. The image node functions as a placeholder but does not duplicate information about the individual represented by the actual node 210. This allows for accurate representations of complicated connectedness without resorting to the duplication of information. Similarly, image links may be used in place of actual links without duplicating the information associated with the actual links. Image links typically connect image nodes. Transitional links may be used to connect an actual node 210 with an image node.

Figure 6:
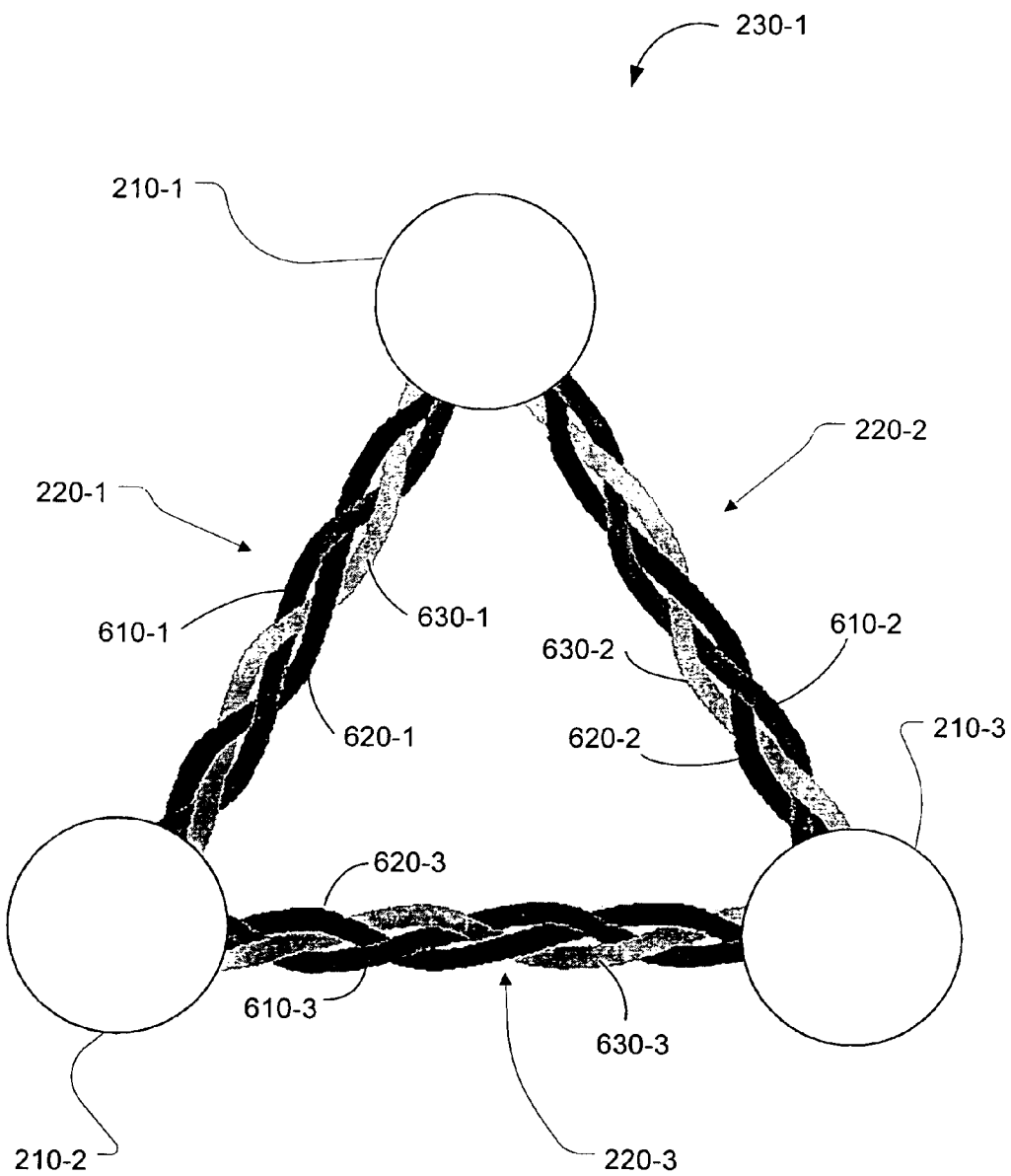
FIG. 6 is a block diagram illustrating a strand-level view of the link triangle of FIG. 5, according to an exemplary embodiment.

Each of the links 220 may have a fine structure including one or more strands. FIG. 6 is a block diagram illustrating a strand-level view of the link triangle 230-1 of FIG. 5, according to an exemplary embodiment. As shown in FIG. 6, each of the links 220 may include multiple strands. In particular, link 220-1 may include strands 610-1, 620-1, and 630-1, link 220-2 may include strands 610-2, 620-2, and 630-2, and link 220-3 may include strands 610-3, 620-3, and 630-3. The strands 610-1, 610-2, and 610-3 are collectively referred to herein as the "strands 610," the strands 620-1, 620-2, and 620-3 are collectively referred to herein as the "strands 620," and the strands 630-1, 630-2, and 630-3 are collectively referred to herein as the "strands 630."

The strands 610, 620, and 630 may represent different types of connections between the nodes 210. In one embodiment, for example, the strands 610 represent natural connections between individuals, the strands 620 represent societal (e.g., legal) connections between individuals, and the strands 630 represent religious connections between individuals. Examples of natural connections include, but are not limited to, procreative relationships between couples and natural parent-child relationships. Examples of societal connections include, but are not limited to, civil marriage, spousal partner relationship, common-law marriage, divorce, separation, adoption, legal guardianship, power of a , and any other societal relationship recognized by laws, customs, traditions, or cultures. Examples of religious connections include, but are not limited to, marriage and any other connection formed by religious rite or principle. For example, religious strands 630 may indicate that individuals have been "sealed" together in accordance with tenets of The Church of Jesus Christ of Latter-Day Saints.

The three types of strands 610, 620, and 630 may be used in combination to visually indicate combinations of connections between individuals. In the case of a child being born, for example, the strands 610, 620, and 630 can indicate any natural, societal, and/or religious types of connections between the child and his or her parents. In particular, the natural strands 610 may indicate whether the child is the natural offspring of the parents. The societal strands 620 may indicate whether the parents are the legally recognized parents of the child. The religious strands 630 may indicate whether the child is "sealed" to the parents in accordance with religious tenets.

While FIG. 6 illustrates three types of strands connecting any two nodes 210, the links 220 may comprise one or more strands representing any type of connection. Accordingly, the system 100 provides capability for expansively representing many different types of connections between individuals. Strands may be created to represent a wide variety of different types of connections, including but not limited to genetic, hereditary, authority, priesthood, conspiracy, terrorist, organizational, and any other type of connection between individuals. This allows wide application of the system 100 for representing virtually any type of connection between individuals. Moreover, the system 100 is comprehensive because the number of strands between nodes 210 can be easily expanded to represent myriad different types of connections. Accordingly, the system 100 supports a vast collection of connection data that is not limited to just one or two types of connections between individuals. The user 140 may select from the vast amounts of data to view information of interest. For example, the user 140 is able to select and view link maps that illustrate particular types of one or more strands. To illustrate, the user 140 may use the system 100 to request and view a link map showing only societal strand connections between the nodes 210.

The user interface 140 is able to display many versions of the link map 200 of FIG. 3, including link maps showing different numbers and combinations of strands between nodes 210. FIG. 6 shows a braid notation in which the strands between nodes 210 are braided together. Each strand may be distinguished by a different color, pattern, or shade. (For example, in a preferred color scheme, red may be used for natural, black for societal, and gold for religious strands.) However, any suitable visual representation of strand detail may be used, including color markers (such as bands) placed on or proximate to the strands.

Figure 7:
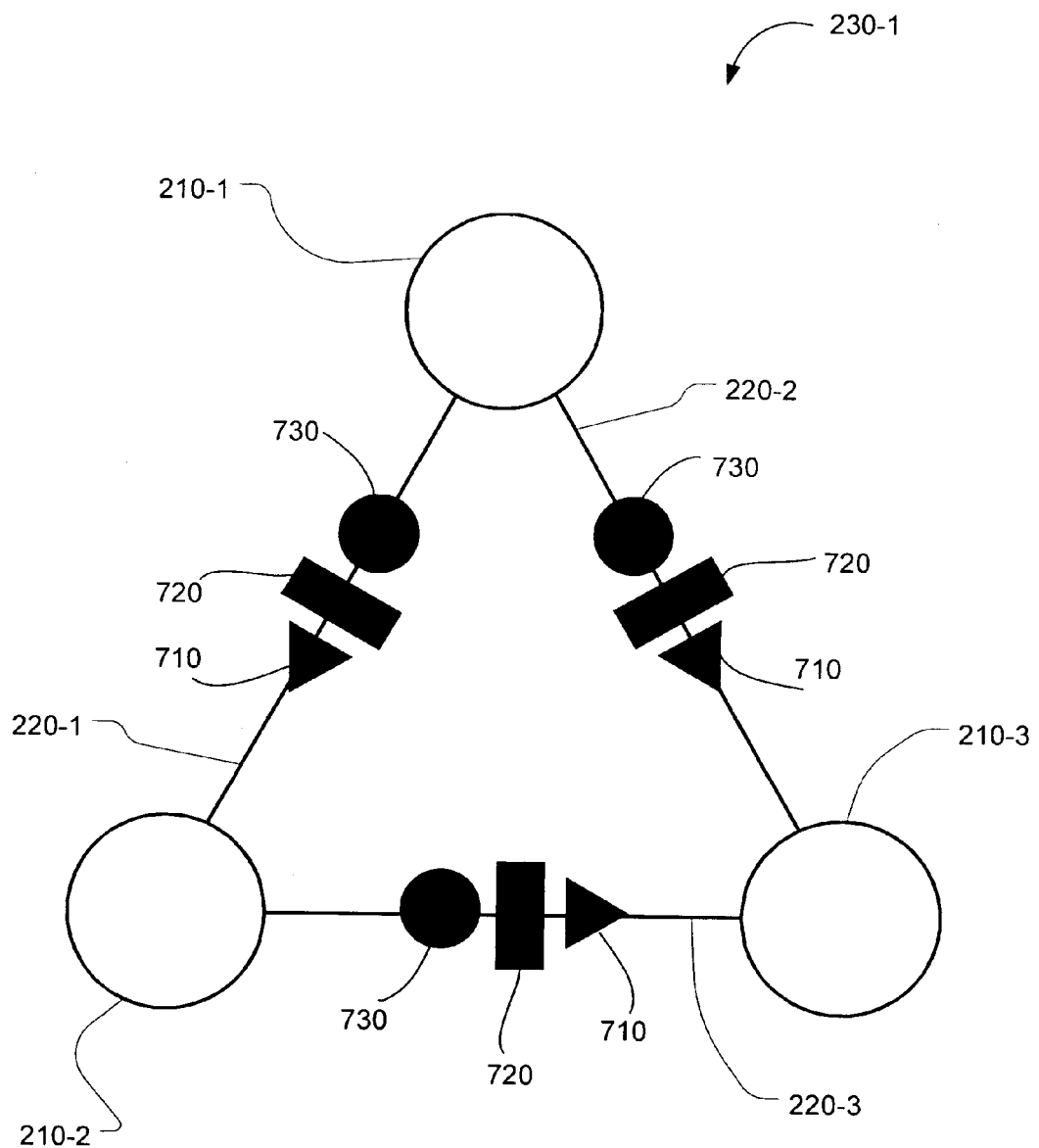
FIG. 7 is a block diagram illustrating another strand-level view in which geometric symbols identify the link strands of the link triangle of FIG. 5, according to an exemplary embodiment.

In some embodiments, geometric symbols are used to identify strand detail. In FIG. 7, for example, the strands 610, 620, and 630 of the links 220 between the nodes 210 of the link triangle 230-1 are identified using geometric symbols in the form of triangles 710, rectangles 720, and circles 730. Strands 610 (i.e., natural strands) may be represented by the triangles 710, strands 620 (i.e., societal strands) may be represented by the rectangles 720, and strands 630 (i.e., religious strands) may be represented by the circles. In other embodiments, alternative symbols may be used to identify the strands.

The fine structure of strands provides significant expansiveness and flexibility, which allows data in the data store 120 to represent numerous different types of connections between individuals. Each strand is typically represented in the data store 120 as a distinct data object. Thus, data objects can easily be added to the system 100 to represent new or different types of connections. Accordingly, the data store 120 is capable of supporting and storing vast collections of data representative of myriad connections and types of connections between individuals.

III. Exemplary Data Structure

As mentioned above, the data store 120 may include node data objects representative of the nodes 210 and strand data objects representative of the strands of the links 220 between the nodes 210. Accordingly, the data store 120 may be organized in an object-oriented fashion. Information that is primarily related to individuals may be stored in or otherwise associated with the node data objects, while information that is primarily related to links between individuals may be stored in or otherwise associated with the strand data objects. Examples of primarily individual-based information include but are not limited to personal names, gender, and events such as birth, death, health and medical history, religious rites (e.g., receiving of ordinances such as baptism), etc. Individual-based event information may be referred to as individual events. Examples of primarily link-based information include but are not limited to events such as marriage, divorce, separation, adoption, initiation or termination of legal relationship, etc. Link-based event information is associated with link strands and may be referred to as link events or as strand events.

Several events display a certain duality and may be classified as both link events and individual events. For example, birth is an individual event for the individual who is born, but birth can also be seen as a link event because it establishes a generational link between two nodes 210. Such types of information may be selectively stored in node data objects, strand data objects, or both, depending on the desired configuration of the data store 120.

By storing link-based information in strand data objects, the system 100 optimizes valuable memory resources because link events may be directly stored in strand data objects, without being duplicated or fragmented across different node data objects. In turn, the reduction of data duplication and fragmentation helps minimize inaccuracies in the data stored in the data store 120. Operational complexity is also minimized. In addition to minimizing duplicate and fragmented data in the data store 120, strand data objects also provide significant flexibility for representing connections between individuals. The modularity of the strand data objects allows different strands to be easily added, removed, or modified, without modifying individual data stored in node data objects.

Figure 8:
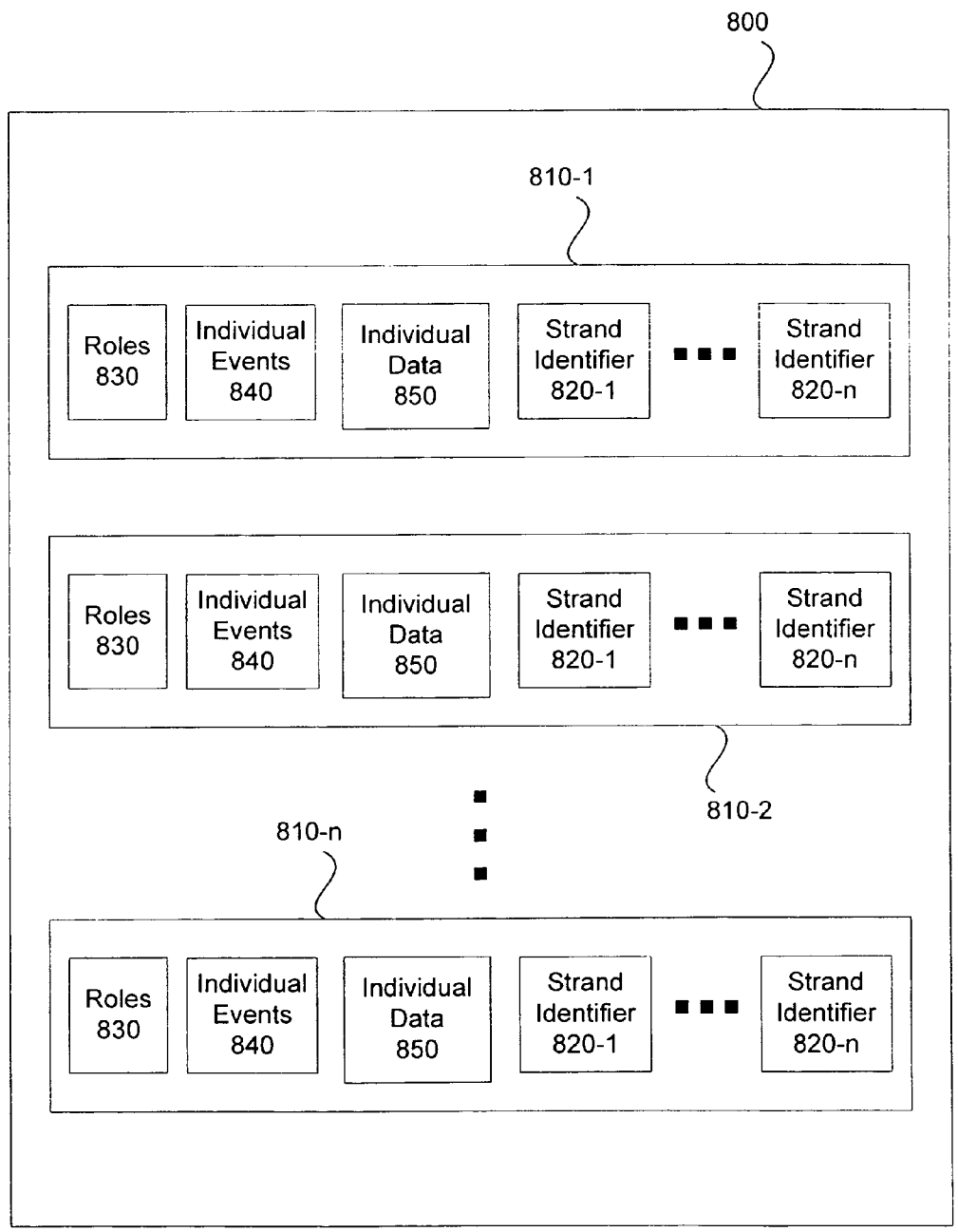
FIG. 8 is a block diagram illustrating an example of a node table implemented in the data store of FIG. 2, according to an exemplary embodiment.
Figure 9:
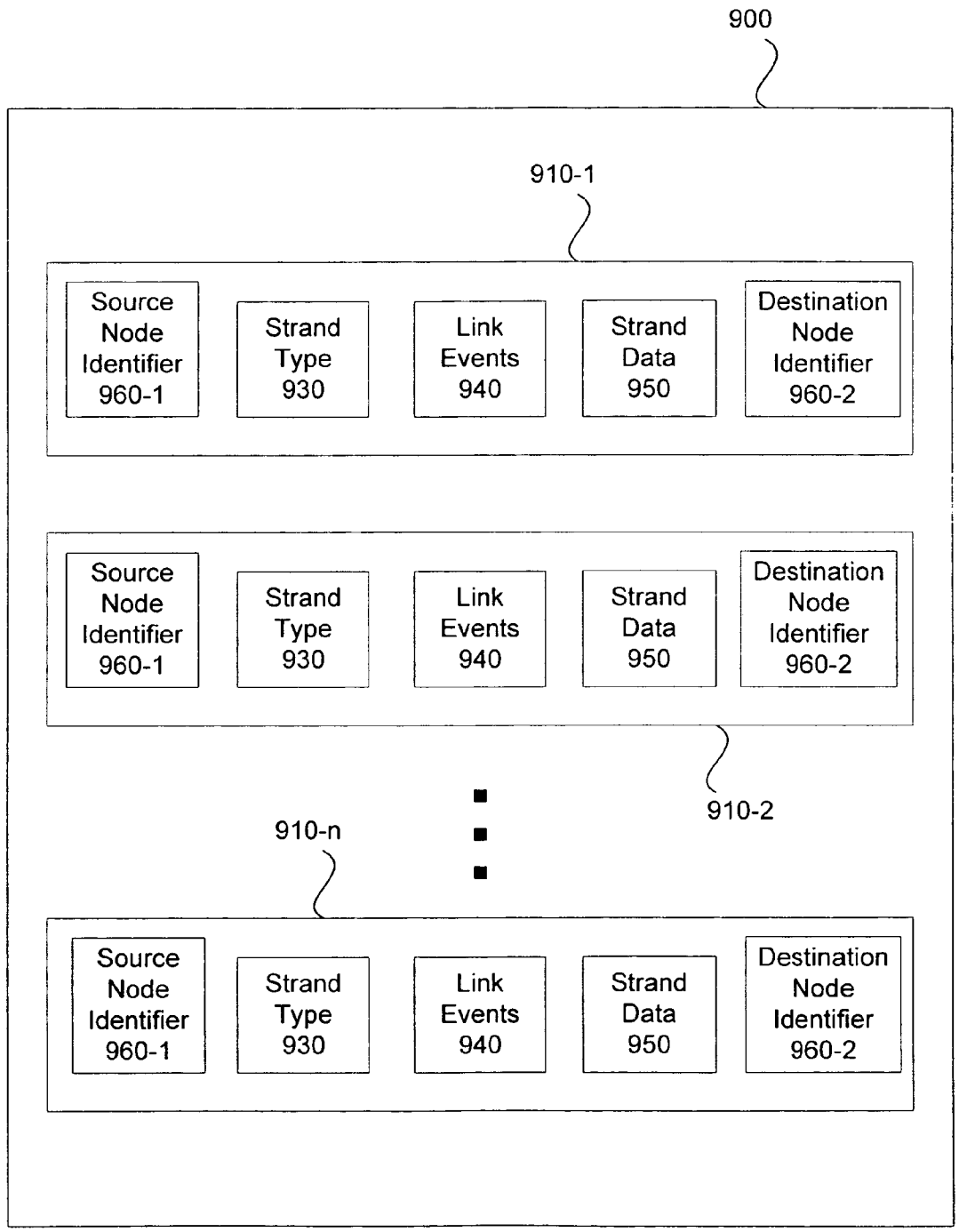
FIG. 9 is a block diagram illustrating an example of a strand table implemented in the data store of FIG. 2, according to an exemplary embodiment.

Node data objects and strand data objects may be organized in distinct database tables. FIGS. 8 and 9 are block diagrams illustrating examples of tables that include node or strand data objects. In particular, FIG. 8 illustrates a node table 800 of node data objects, according to an exemplary embodiment, and FIG. 9 illustrates a strand table 900 of strand data objects, according to an exemplary embodiment.

As shown in FIG. 8, the node table 800 may include one or more node data objects 810-1 through 810-n (collectively the "node data objects 810"). Each of the node data objects 810 may include individual-based information, as well as cross-references (e.g., pointers) to strand data objects that are connected to the node data objects 810. For example, the node data objects 810 may include information related to individual roles 830, individual events 840, and any other individual-based data 850, including the name and gender of an individual. Individual roles 830 may include one or more roles associated with the individual represented by the node data object 810, including but not limited to parent, spouse, and child. The individual roles 830 typically identify a functional relationship of the individual toward another individual. Individual events 840 may include any primarily individual events associated with the individual, including but not limited to birth, death, religious rites (e.g., baptism, confirmation, and reception of other ordinances), medical history, biological data, etc. Individual data 850 may include any other information concerning the individual.

Each of the node data objects 810 also includes one or more strand identifiers 820-1 through 820-n (collectively the "strand identifiers 820"). The strand identifiers 820 provide cross-references to strands connected to the node 210 represented by a particular node data object 810. The strand identifiers 820 may include pointers or any other suitable mechanisms for referencing connected strands.

As shown in FIG. 9, the strands may be represented as distinct strand data objects 910-1 through 910-n (collectively the "strand data objects 910") stored in the strand table 900. Each of the strand data objects 910 may include link-based information, as well as cross-references (e.g., pointers) to node data objects 810 that are connected by the strand data objects 910. For example, the strand data objects 910 may include information related to strand type 930, link events 940, and any other link or strand-based data 950. A strand type 930 may indicate whether a particular strand 910 is a natural, societal, religious, or other predefined type of strand 910. Link events 940 may include any primarily link-based events, including but not limited to event types such as marriages, religious rites (e.g., "sealing" ordinances), place, and/or date of formation or termination (e.g. annulment, cancellation, suspension) of the link, etc. Strand data 950 may include any other link-based or strand-based information, including but not limited to directionality on a strand (e.g. forward or backward in time), a certainty score related to a confidence level of a strand being accurate, roles of the nodes 210 connected by a strand, and the orientation of a strand (e.g., inter-generational [vertical] strand or intra-generational [horizontal] strand).

Each of the strand data objects 910 also includes a source node identifier 960-1 and a destination node identifier 960-2 (collectively the "node identifiers 960"). The node identifiers 960 provide cross-references to nodes 210 that are connected by a particular strand 910. The node identifiers 960 may include pointers or any other suitable mechanisms for referencing connected nodes 210.

The table 900 of FIG. 9 may include strand data objects 910 of different strand types 930 or of a common strand type 930. For example, the table 900 may include only strand data objects 910 of the natural type, which represent bloodline connectedness between individuals. Additional strand tables 900 may be provided for storing strand data objects 910 of other strand types 930, such as societal, religious, and other types of strands.

The data contained in the node data objects 810 and strand data objects 910 may be stored in separate tables in the data store 120. For example, individual events 840 and link events 940 may be stored in one or more event tables. Elements 840 and 940 may then include cross-references to data in the event table(s). The individual events 840 and link events 940 are typically secondary information that does not dictate the organization of the data in the data store 120.

The data store 120 may include one or more distinct tables for storing source information, which identifies the sources of the information contained in the data store 120. When a particular user 150 enters information (e.g., link or individual event information) into the system 100, the system 100 may record data identifying the user 150 as the source of the information. The data may be stored in one or more tables in the data store 120. Certainty scores may be assigned to the entered information based on the source of the information.

As mentioned above, the use of distinct data objects to represent strands provides a robust and flexible data structure capable of intuitively representing complex connections between individuals. A strand data object 910 of a particular type may be added, deleted, or modified without affecting strand data objects 910 of other types. For example, when a religious rite is performed to "seal" two individuals together, a religious strand data object 910 may be created or modified to reflect the corresponding connectedness between the individuals, without having to update any other types of strands (e.g., natural or societal) existing between the individuals. In this manner, the system 100 allows for robust representation of many different types and combinations of connections between individuals. Moreover, the use of strand data objects 910 to store link-based information generally reduces data fragmentation and duplication between the node data objects 810. Thus, the use of strand data objects 910 to represent strands of the links 220 supports a flexible and intuitive system 100 for representing connectedness between individuals.

IV. Exemplary Method of Using the System of FIG. 2

Figure 10:
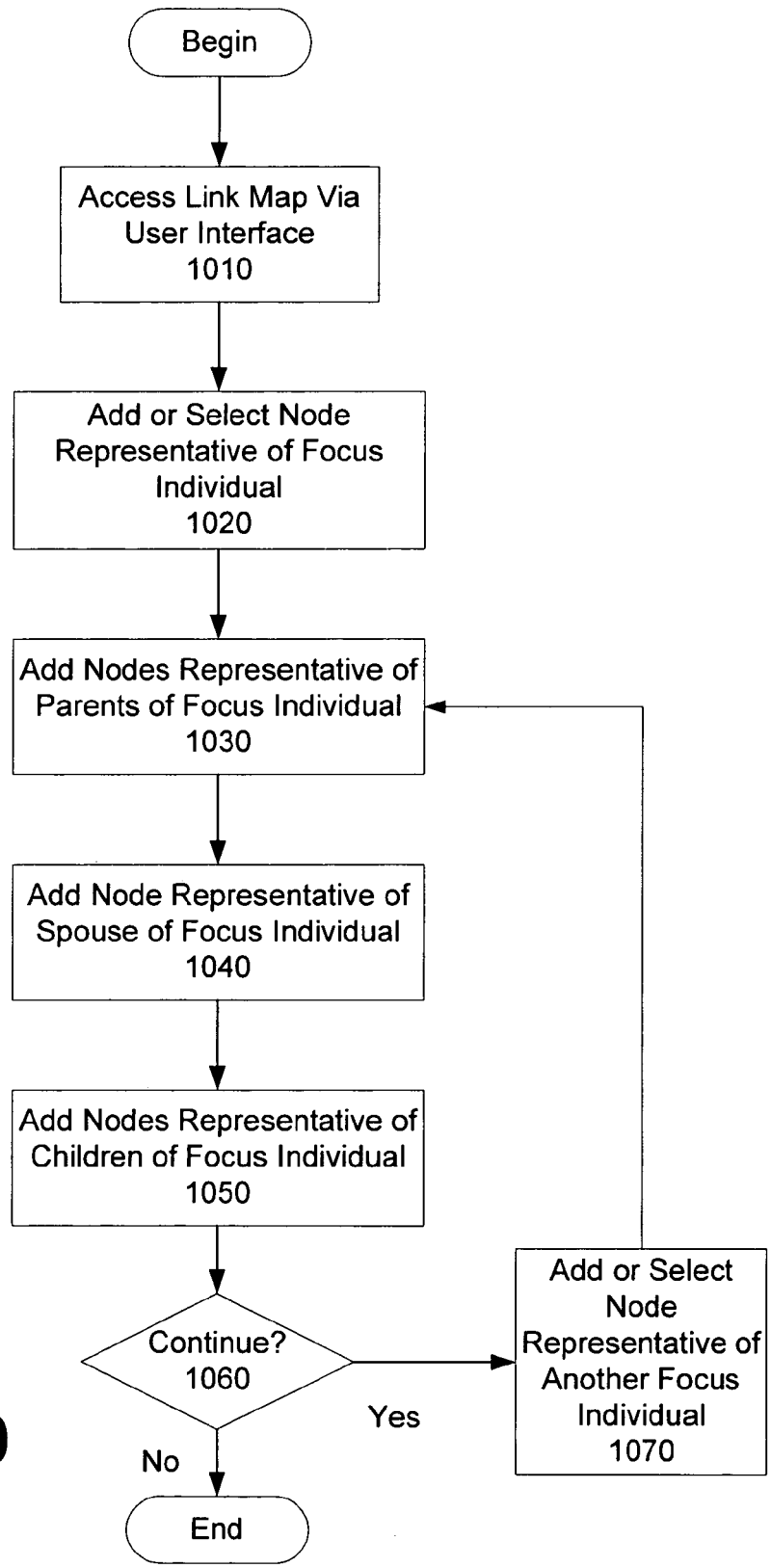
FIG. 10 is a flowchart illustrating an example of a method for using the system of FIG. 2 to create a link map, according to an exemplary embodiment.
Figure 11A:
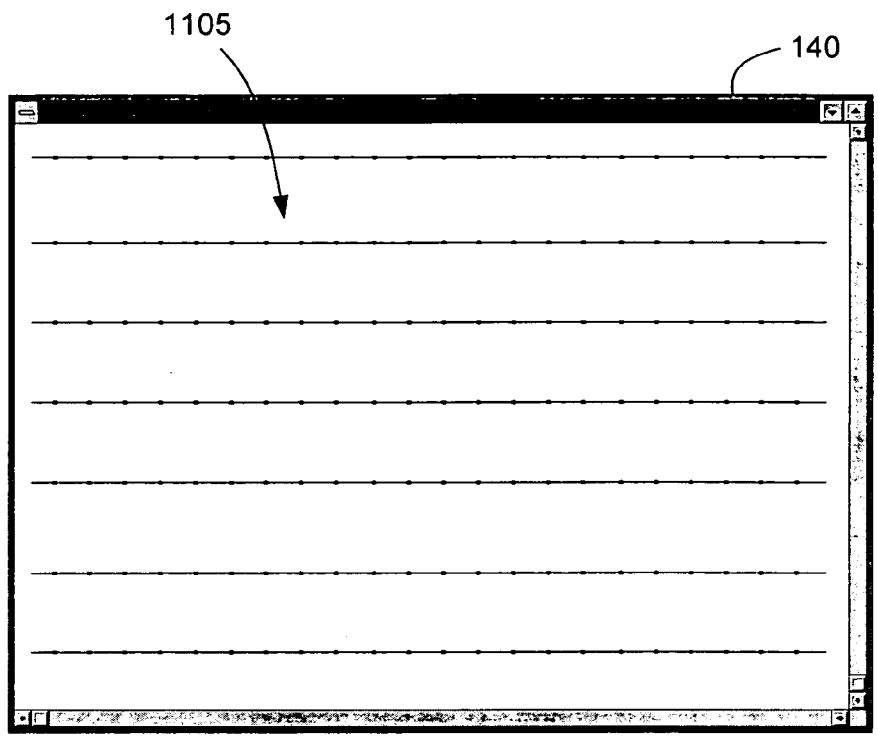
FIG. 11A is a view of an example of an initial link map template as presented in the user interface of FIG. 2, according to an exemplary embodiment.

FIG. 10 is a flowchart illustrating a method of creating a link map using the system 100 of FIG. 2, according to an exemplary embodiment. The method of FIG. 10 begins by accessing a link map via the user interface 140 at step 1010. Any particular user 150 may use the access device 130 to access the user interface 140 as discussed above. The user interface 140 may include a link map such as the link map 200 of FIG. 3. The link map may be presented in two-dimensional or three-dimensional form. The user interface 140 may present a link map template to the user 150 as a starting point for creating a link map. An example of a user interface 140 including a link map template 1105 is shown in FIG. 11A.

Figure 11B:
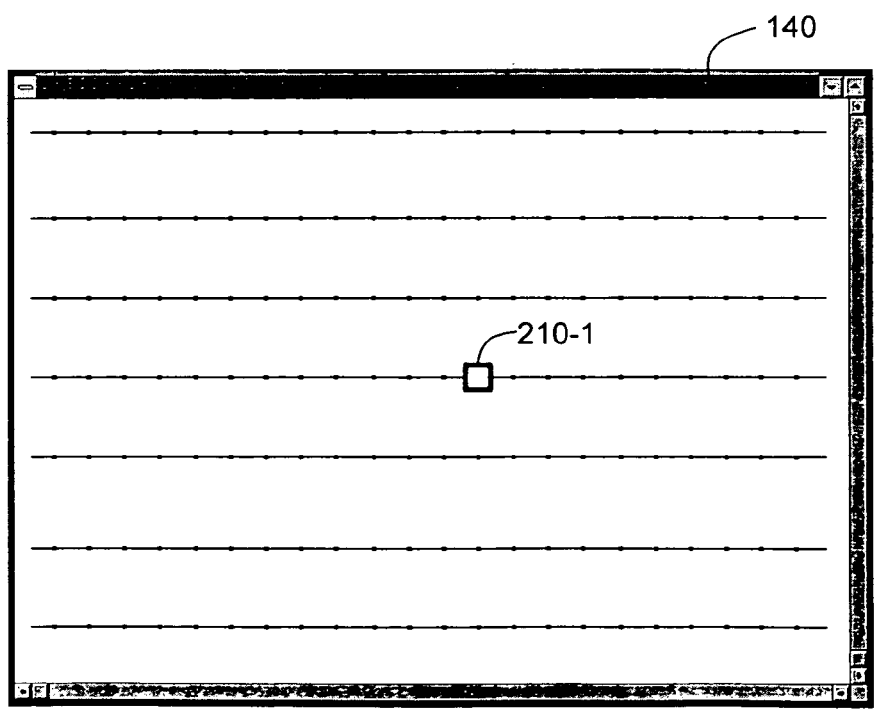
FIG. 11B is a view of a node representative of a focus individual as presented in the link map template of FIG. 11A, according to an exemplary embodiment.

At step 1020 of FIG. 10, the user 150 adds or selects a node 210 representative of a focus individual. The user interface 140 may prompt the user 150 to perform step 1020. The user interface 140 may provide any helpful tools for performing step 1020. FIG. 11B illustrates a node 210-1 representative of a focus individual being added to the link map template contained in the user interface 140. The node 210-1 may be in the form of an empty square, triangle, or circle. The emptiness of the shape may indicate that the node 210-1 is representative of the current focus individual, and the square, triangle, or circle shape of the node 210-1 may be representative of the male, female, or unspecified gender respectively of the focus individual.

Figure 11C:
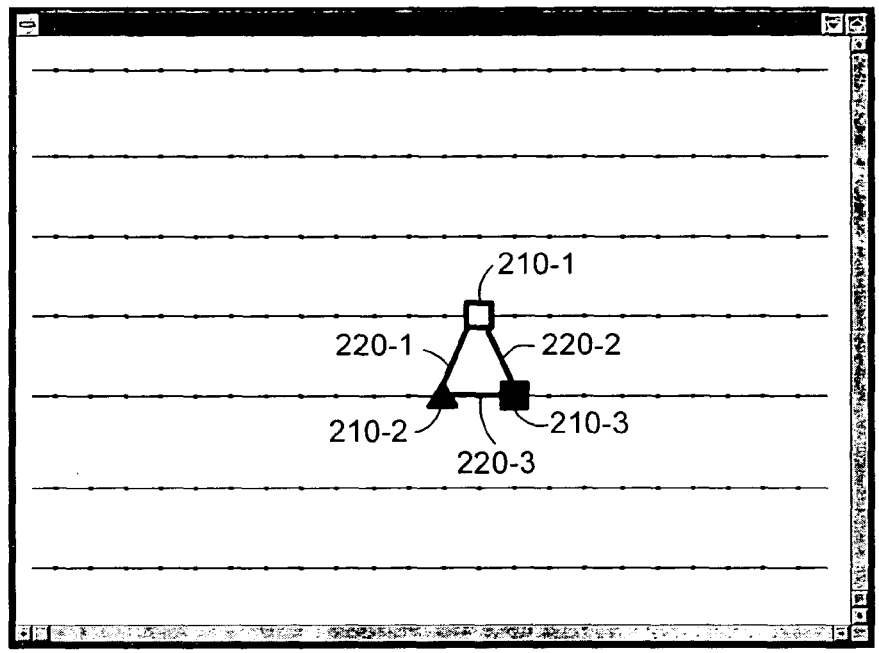
FIG. 11C is a view of nodes representative of parents of the focus individual of FIG. 11B being added to the link map template of FIG. 11A, according to an exemplary embodiment.

At step 1030 of FIG. 10, the user 150 adds nodes 210 representative of parents of the focus individual. The user interface 140 may prompt the user 150 to perform step 1030 and may provide any helpful tools for performing this step. FIG. 11C illustrates the user interface 140 showing nodes 210-2 and 210-3 being linked to the node 210-1. The nodes 210-1 through 210-3 and the links 220-1 through 220-3 form a link triangle 230, as discussed above. The nodes 210-2 and 210-3 are representative of the parents of the focus individual represented by node 210-1.

Figure 11D:
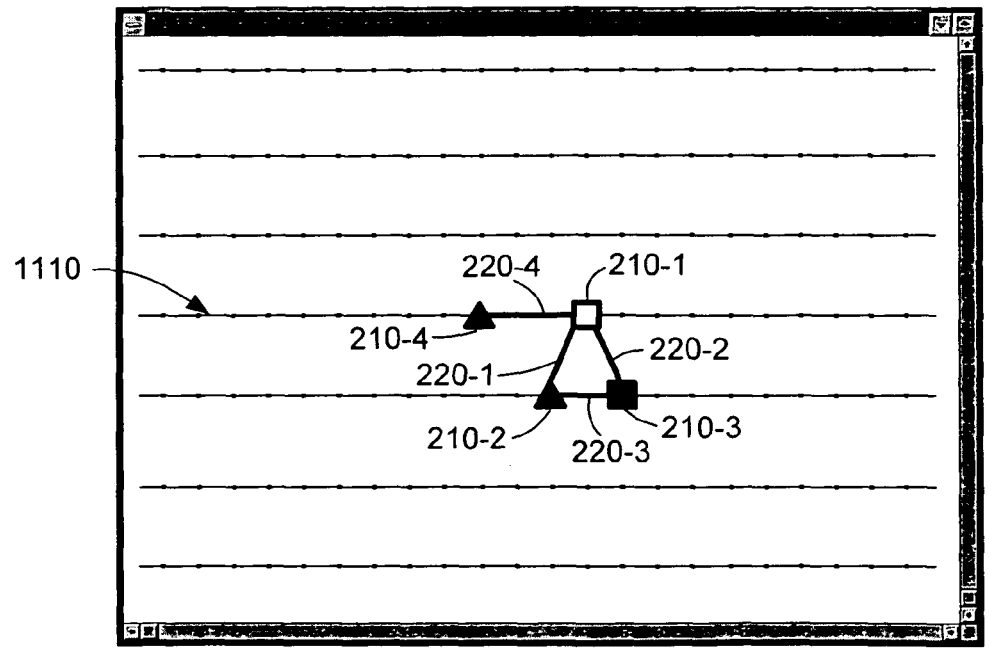
FIG. 11D is a view of a node representative of a spouse of the focus individual of FIG. 11B being added to the link map template of FIG. 11A, according to an exemplary embodiment.

At step 1040 of FIG. 10, the user 150 adds node 210-4, which is representative of a spouse (or other spouse-type role) of the focus individual. The user interface 140 may prompt the user 150 to perform step 1040 and may provide any helpful tools for performing this step. FIG. 11D illustrates the user interface 140 showing node 210-4 linked to node 210-1 by link 220-4. The nodes 210-1 and 210-4 are positioned on a common generational line 1110, which is similar to the generational planes 224 of FIG. 3.

Figure 11E:
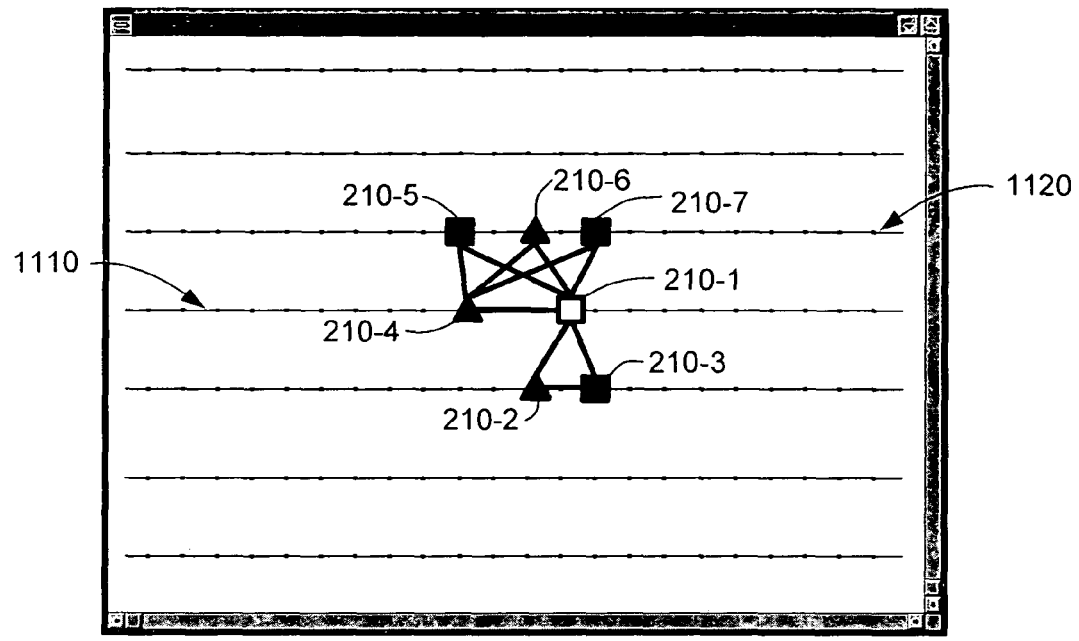
FIG. 11E is a view of nodes representative of children of the focus individual and spouse of FIG. 11D being added to the link map template of FIG. 11A, according to an exemplary embodiment.

At step 1050 of FIG. 10, the user 150 adds nodes 210 representative of children of the focus individual. The user interface 140 may prompt the user 150 to perform step 1050 and may provide any helpful tools for performing this step. FIG. 11E illustrates the user interface 140 showing nodes 210-5 through 210-7 being linked to the nodes 210-1 and 210-4. For purposes of clarity, link reference numbers have been omitted from FIG. 11E. A link triangle 230 is formed between the parent nodes 210-1 and 210-4 and each of the children nodes 210-5 through 210-7, as discussed above. The nodes 210-5 through 210-7 are representative of the children of the individuals represented by nodes 210-1 and 210-4. Accordingly, the nodes 210-5 through 210-7 are located on a common generational line 1120.

Figure 11F:
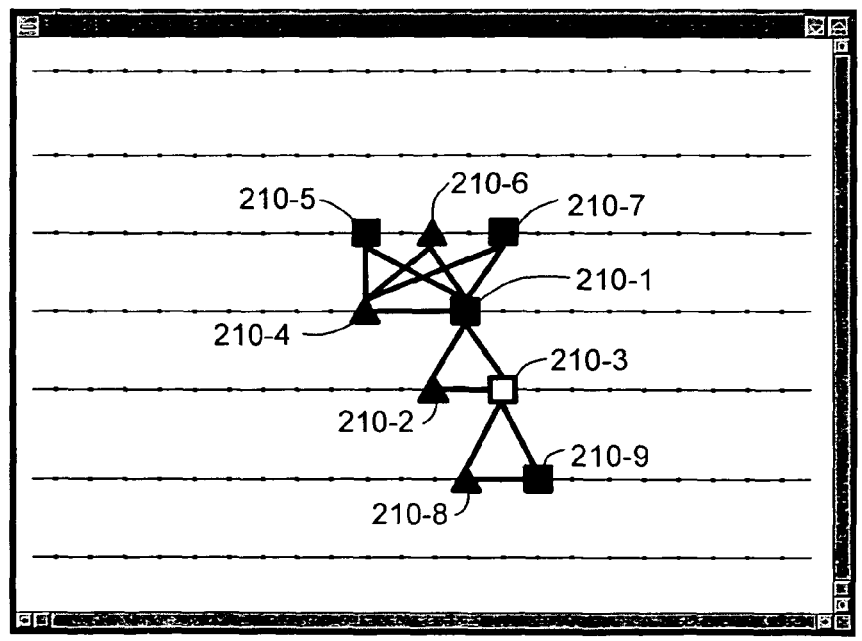
FIG. 11F is a view of another node being selected as a focus individual, as well as nodes representative of the selected focus individual being added to the link map template of FIG. 11A, according to an exemplary embodiment.

At step 1060, the system 100 prompts the user 150 to select whether to continue or stop. If the user 150 elects not to continue, the process of FIG. 10 ends. On the other hand, if the user 150 elects to continue, processing moves to step 1070, at which step the user 150 may add or select a node 210 representative of another focus individual. For example, the user 150 may select node 210-3 to be the new focus individual. The process then returns to step 1030. At step 1030 of FIG. 10, the user 150 adds nodes 210 representative of parents of the focus individual, as discussed above. FIG. 11F illustrates the user interface 140 showing nodes 210-8 and 210-9 being linked to the node 210-3. The nodes 210-8 and 210-9 are representative of the parents of the focus individual represented by node 210-3. Steps 1030 through 1070 may be repeated for each selected focus individual.

The steps of adding nodes 210 to a link map may include providing or modifying any data associated with the individuals represented by the nodes 210. Similarly, data associated with the links 220 between the nodes 210 may be provided or modified.

While the steps of FIG. 10 are directed to an example of creating a link map, similar steps may be performed to modify existing link maps provided by the system 100. The system 100 may provide instructions and tools useful for entering, modifying, searching, and deleting data related to the connectedness of individuals. The user interface 140 provides a visual display which may be used to perform such functions.

According to one exemplary embodiment, the present systems, methods, and graphical tools described herein may be implemented as instructions on a computer-readable carrier. Program(s) of the computer-readable carrier define functions of embodiments and can be contained on a variety of signal-bearing media, which include, but are in no way limited to, information permanently stored on non-writable storage media (e.g., read-only memory devices within a computer such as CD-ROM or DVD-ROM disks readable by a CD-ROM drive or a DVD drive); alterable information stored on writable storage media (e.g., floppy disks within a diskette drive or hard-disk drive or read/writable CD or read/writable DVD); or information conveyed to a computer by a communications medium, such as through a computer or network, including wireless communications. The latter embodiment specifically includes information downloaded over the Internet and other networks. Such signal-bearing media or computer readable carriers, when carrying computer-readable instructions that direct functions of the present systems, methods, and graphical tools, represent embodiments of the present systems, methods, and graphical tools. In many embodiments, the systems, methods, and graphical tools are implemented as software programs configured to instruct operations on one or more server devices.

The preceding description has been presented only to illustrate and describe the present methods, systems, and graphical tools. It is not intended to be exhaustive or to limit the present methods, systems, and graphical tools to any precise form disclosed. Many modifications and variations are possible in light of the above teaching. For example, while exemplary systems, methods, and graphical tools have been described with reference to genealogical applications, the present systems, methods, and graphical tools may be implemented in many other applications to describe different types of connectedness between individuals. For example, the present systems, methods, and graphical tools may be used to represent connectedness in medical, genetic, inheritable disease tracing, legal, security, law enforcement, and military intelligence applications.

The foregoing embodiments were chosen and described in order to illustrate principles of the methods, systems, and graphical tools, as well as some practical applications. The preceding description enables others skilled in the art to utilize the methods, systems, and graphical tools in various embodiments and with various modifications as are suited to the particular use contemplated. It is intended that the scope of the methods, systems, and graphical tools be defined by the following claims.

What is claimed is:

1. A system comprising:
    a processor;
    a memory, said memory storing instructions executable by said processor;
    data structures contained within said memory, wherein said data structures, when accessed by said processor are configured to display a visual representation of individuals and relationships between individuals;

wherein said data structures further include:
a plurality of data objects that are graphically illustrated as a plurality of distinct nodes, said plurality of data objects graphically illustrated as said plurality of distinct nodes being representative of a plurality of individuals, said plurality of data objects graphically illustrated as said plurality of distinct nodes including a first data object representative of and including data associated with a first individual and a second data object representative of and including data associated with a second individual, said first data object graphically illustrated as a first node representative of the first individual, said second data object graphically illustrated as a second node representative of the second individual; and
a first variable number of independent data objects including data object properties, graphically illustrated as a first variable number of strands connecting said first node and said second node;
wherein each independent data object graphically illustrated as a strand of said first variable number of strands being representative of and including data associated with a type of unique relationship between the first individual and the second individual; and
wherein each strand of said first variable number of strands is configured to connect to said plurality of distinct nodes and connects no more than two nodes, and further comprises:
exactly two end points;
an elemental connection that is not further divisible, is independent of all other strands, and does not connect to another strand;
wherein said data object properties of said first variable number of independent data objects include a certainty score between nodes, wherein the certainty score indicates a confidence level that said type of unique relationship between the first individual and the second individual represented by said first variable number of strands is accurate.

2. The system of claim 1, wherein said first variable number of independent data objects graphically illustrated as said first variable number of strands includes a first data object graphically illustrated as a first strand representative of a first type of relationship between the first individual and the second individual and a second data object graphically illustrated as a second strand representative of a second type of relationship between the first individual and the second individual.

3. The system of claim 2, wherein said first variable number of independent data objects graphically illustrated as said first variable number of strands includes a third data object graphically illustrated as a third strand representative of a third type of relationship between the first individual and the second individual.

4. The system of claim 3, wherein said first strand comprises a natural strand, said second strand comprises a societal strand, and said third strand comprises a religious strand, wherein said first, second, and third strand form a bundle of strands, said bundle of strands representing a fine-structure of said connection created by said first variable number of strands, wherein said first strand, said second strand, and said third strand terminate between the same first and second node, and where said strands remain separate, and independent of each other, and do not intersect or join each other.

5. The system of claim 4, wherein said natural strand represents a natural kin relationship, said societal strand represents a legal relationship, and said religious strand represents a religious relationship.

6. The system of claim 1, further comprising a data store, wherein each of said first variable number of independent data objects graphically illustrated as said first variable number of strands is stored in said data store in the form of a distinct data object.

7. The system of claim 1, further comprising:
a third data object graphically illustrated as a third node representative of a third individual;
a second variable number of independent data objects graphically illustrated as a second variable number of strands connecting said first node and said third node; and
a third variable number of independent data objects graphically illustrated as a third variable number of strands connecting said second node and said third node;
wherein said first node, said second node, said third node, said first variable number of independent data objects graphically illustrated as said first variable number of strands, said second variable number of independent data objects graphically illustrated as said second variable number of strands, and said third variable number of independent data objects graphically illustrated as said third variable number of strands form a link triangle; and
wherein said triangle forms a fundamental geometric shape consistently incorporated by said system to graphically describe the interconnectedness of said plurality of distinct nodes, each node representing a data object representing an individual.

8. The system of claim 7, wherein said first data object graphically illustrated as said first node includes data identifying a child role as being associated with the first individual, said second data object graphically illustrated as said second node includes data identifying a parent role and a spouse role as being associated with the second individual, and said third data object graphically illustrated as said third node includes data identifying a parent role and a spouse role as being associated with the third individual, the connection between the second individual and the third individual establishing a network-type connectivity in the system;
wherein said first node is disposed in a first generational layer and said second node and said third node are disposed in a second generational layer.

9. The system of claim 1, wherein each independent data object graphically illustrated as a strand of said first variable number of strands includes data stored in the memory, the data indicating when the unique relationship between the first individual and the second individual was formed.

10. The system of claim 1, wherein said first data object identifies a child as being associated with the first individual, said second data object identifies a first parent as being associated with the second individual, and a third data object identifies a second parent as being associated with a third individual.

11. The system of claim 10, wherein said first variable number of strands connect said data objects to form at least one link triangle between said first data object, said second data object, and said third data object.

12. The system of claim 11, wherein said at least one link triangle only comprises said first data object that identifies said child, said second data object that identifies said first parent, and said third data object that identifies said second parent.

13. A system for organizing and graphically representing data, comprising:
a processor;

a memory, said memory storing instructions executable by said processor;

data structures contained within said memory, wherein said data structures, when accessed by said processor are configured to display a visual representation of individuals and relationships between said individuals;

wherein said data structures further include:

a plurality of object oriented data graphically illustrated as a plurality of distinct nodes which map to said plurality of object oriented data representative of and including data associated with a plurality of individuals, said plurality of object oriented data including a first data object representative of and including data associated with a first individual and a second data object representative of and including data associated with a second individual, said first data object graphically illustrated as a first node representative of the first individual, said second data object graphically illustrated as a second node representative of the second individual; and a first graphical representation of a variable number of strands representing independent data objects that define connections between said first node and said second node, each of said variable number of strands being representative of and including data associated with a type of relationship between the first node representing the first individual, and the second node representing the second individual;

wherein each of said variable number of strands connect no more than two visually distinctive nodes representing data objects and further includes:

exactly two node terminated end points;

an elemental connection that is not further divisible and cannot connect to another strand; and data object properties of said variable number of strands, wherein said data object properties include a variable number of a certainty score, wherein the certainty score indicates a confidence level that said type of relationship between the first individual and the second individual represented by said variable number of strands is accurate.

14. The system of claim 13, wherein said variable number of strands includes a first strand data object representative of a first type of relationship between the first individual and the second individual and a second strand data object representative of a second type of relationship between the first individual and the second individual.

15. The system of claim 14, wherein said variable number of strands includes a third strand data object representative of a third type of relationship between the first individual and the second individual.

16. The system of claim 15, wherein said first strand data object represents a natural strand, said second strand data object represents a societal strand, and said third strand data object represents a religious strand.

17. The system of claim 16, wherein said natural strand represents a natural kin relationship, said societal strand represents a legal relationship, and said religious strand represents a religious relationship.

18. The system of claim 13, further comprising:

a third data object representative of and including data associated with a third individual, said third data object graphically illustrated as a third node representative of the third individual;

a second graphical representation of a variable number of strands representing independent data objects that define connections between said first node and said third node; and a third graphical representation of a variable number of strands representing independent data objects that define connections between said second node and said third node, wherein said first data object, said second data object, said third data object, said first graphical representation of said variable number of strands, said second graphical representation of said variable number of strands, and said third graphical representation of said variable number of strands define a link triangle; and wherein said link triangle forms a fundamental geometric shape consistently used to graphically describe the interconnectedness of a plurality of nodes, each node representing a data object representing an individual.

19. The system of claim 18, wherein said first data object graphically illustrated as said first node includes data identifying a child role as being associated with the first individual, said second data object graphically illustrated as said second node includes data identifying a parent role and a spouse role as being associated with the second individual, and said third data object graphically illustrated as said third node includes data identifying a parent role and a spouse role as being associated with the third individual.

20. The system of claim 19, further comprising:

a fourth data object representative of and including data associated with a fourth individual, said fourth data object graphically illustrated as a fourth node representative of the fourth individual;

a fourth graphical representation of a variable number of strands representing independent data objects that define connections between said first node and said fourth node including data identifying parent and child roles respectively;

a fifth data object representative of and including data associated with a fifth individual, said fifth data object graphically illustrated as a fifth node representative of the fifth individual;

a fifth graphical representation of a variable number of strands representing independent data objects that define connections between said fifth node and said fourth node including data identifying parent and child roles respectively; and a sixth graphical representation of a variable number of strands representing independent data objects that define connections between said first node and said fifth node including data identifying a spousal role, said fourth graphical representation of said variable number of strands, said fifth graphical representation of said variable number of strands, and said sixth graphical representation of said variable number of stands between said first node, said fourth node, and said fifth node forming a second link triangle;

wherein said second link triangle forms a second fundamental geometric shape consistently used to graphically describe an interconnectedness of a plurality of nodes, each node representing a data object representing an individual, and wherein only said first node is shared between both said first and second triangles.

21. The system of claim 20, wherein said first link triangle and second link triangle graphically illustrate an inter-generational connectedness between said individuals represented by said first node, said second node, said third node, said fourth node, and said fifth node;

wherein said first and second link triangles form a repeated portion of a network of a plurality of link triangles.

22. The system of claim 21, wherein at least one strand representing said spousal roles defines a generational plane;

wherein said first node is in a first generational plane and said second node, said third node, said fourth node, and said fifth node are in a second generational plane.

23. In a computer system having a display device, a method of organizing data and visually representing connectedness of individuals, comprising:

receiving information related to a first individual;

assigning said information related to said first individual to a first data object in a memory, said memory being configured to store instructions executable by a processor, said information related to said first individual including instructions to display said first individual on said display device as a first node;

receiving information related to a second individual;

assigning said information related to said second individual to a second data object in said memory, said information related to said second individual including instructions to display said second individual on said display device as a second node;

receiving information detailing a first link of said first individual and said second individual;

assigning said information related to said first link of said first individual and said second individual to a third data object in said memory, said information corresponding to a relationship of said first individual and said second individual including instructions to display said first link on said display device as a first variable number of at least one strand connecting said first node and said second node;

wherein each of said first variable number of at least one strand connects no more than two nodes and further comprises:

exactly two end points;

an elemental connection that is not further divisible and cannot connect to another strand;

data object properties, wherein said data object properties include a certainty score, between nodes, wherein the certainty score indicates a confidence level that said relationship between the first individual and the second individual represented by said first variable number of at least one strand is accurate.

24. The method of claim 23, further comprising displaying at least one indicator configured to identify said type of relationship represented by said link connecting said first node and said second node.

25. The method of claim 24, wherein said at least one indicator is in the form of geometric shapes positioned approximately on or adjacent to said strand.

26. The method of claim 23, wherein said first link displayed as said first variable number of at least one strand comprises a first strand representative of a first type of relationship between said first individual and said second individual and a second strand representative of a second type of relationship between said first individual and said second individual.

27. The method of claim 26, wherein said first variable number of at least one strand further comprise a third strand representative of a third type of relationship between said first individual and said second individual.

28. The method of claim 27 wherein said first strand comprises a natural strand, said second strand comprises a societal strand, and said third strand comprises a religious strand.

29. The method of claim 28, wherein said natural strand represents a natural kin type relationship, said societal strand represents a legal relationship, and said religious strand represents a religious relationship.

30. The method of claim 23, further comprising:

receiving information related to a third individual;

assigning said information related to said third individual to a third data object in said memory, said information related to said third individual including instructions to display said third individual on said display device as a third node;

receiving information detailing a second link of said first individual and said third individual;

assigning said information related to said second link of said first individual and said third individual to a fourth data object in said memory, said information corresponding to said second link of said first individual and said third individual including instructions to display said second link on said display device as a second variable number of at least one strand connecting said first node and said third node;

receiving information detailing a third link of said third individual and said second individual;

assigning said information related to said third link of said third individual and said second individual to a fifth data object in said memory, said information corresponding to said third link of said third individual and said second individual including instructions to display said third link on said display device as a third variable number of at least one strand connecting said third node and said second node;

wherein said first node, said second node, said third node, said first variable number of at least one strand, said second variable number of at least one strand, and said third variable number of at least one strand form a link triangle.

31. The method of claim 30, wherein said first node identifies a child role as being associated with the first individual, said second node identifies a parent role and a spouse role as being associated with the second individual, and said third node identifies a parent role and a spouse role as being associated with the third individual.

32. The method of claim 23, wherein said first link comprises a pseudo-link representative of an unknown number of inter-generational links connecting said first node and said second node.

* * * * *